US011545930B2

(12) United States Patent
Gong et al.

(10) Patent No.: US 11,545,930 B2
(45) Date of Patent: Jan. 3, 2023

(54) PHOTOVOLTAIC FRAME, PHOTOVOLTAIC MODULE AND METHOD FOR MANUFACTURING PHOTOVOLTAIC FRAME

(71) Applicants: JINKO SOLAR CO., LTD., Jiangxi (CN); ZHEJIANG JINKO SOLAR CO., LTD., Zhejiang (CN)

(72) Inventors: Xinxin Gong, Jiangxi (CN); Zhiqiu Guo, Jiangxi (CN); Junhui Liu, Jiangxi (CN); Zehui Zhang, Jiangxi (CN)

(73) Assignees: JINKO SOLAR CO., LTD., Jiangxi (CN); ZHEJIANG JINKO SOLAR CO., LTD., Zhejiang (CN)

( * ) Notice: Subject to any disclaimer, the term of this patent is extended or adjusted under 35 U.S.C. 154(b) by 0 days.

(21) Appl. No.: 17/730,179

(22) Filed: Apr. 26, 2022

(65) Prior Publication Data
US 2022/0255498 A1    Aug. 11, 2022

Related U.S. Application Data

(63) Continuation of application No. 17/092,174, filed on Nov. 6, 2020, now Pat. No. 11,356,053.

(30) Foreign Application Priority Data

Sep. 30, 2020  (CN) .......................... 202011061500.8

(51) Int. Cl.
*H02S 30/10* (2014.01)
(52) U.S. Cl.
CPC ..................... *H02S 30/10* (2014.12)
(58) Field of Classification Search
CPC ...................................... H02S 30/10
See application file for complete search history.

(56) References Cited

U.S. PATENT DOCUMENTS

| 2014/0339179 | A1* | 11/2014 | West | F24S 25/632 |
|---|---|---|---|---|
| | | | | 211/41.1 |
| 2016/0322525 | A1* | 11/2016 | Wang | H01L 31/048 |
| 2017/0005215 | A1* | 1/2017 | Wang | H02S 30/10 |

FOREIGN PATENT DOCUMENTS

| CN | 1668397 A | 9/2005 |
|---|---|---|
| CN | 1703289 A | 11/2005 |

(Continued)

OTHER PUBLICATIONS

Jinko Solar Co., Ltd., et al., Notice of Allowance, U.S. Appl. No. 17/092,174, dated Jan. 27, 2022, 25 pgs.

(Continued)

*Primary Examiner* — Jayne L Mershon
(74) *Attorney, Agent, or Firm* — USCH Law, PC

(57) ABSTRACT

Disclosed are a photovoltaic frame and a photovoltaic module. The photovoltaic frame includes a top support portion, a bottom support portion, a transverse edge portion, a first side edge portion and a second side edge portion. The top support portion, the transverse edge portion and the second side edge portion enclose a holding slot. The photovoltaic frame further includes a first weather-resistant protective layer configured to cover a part of outer surfaces of the top support portion, the bottom support portion, the first side edge portion, the second side edge portion and the transverse edge portion, and a second weather-resistant protective layer configured to cover at least part of the outer surfaces that are not covered by the first weather-resistant protective layer. A thickness of the second weather-resistant protective layer is less than a thickness of the first weather-resistant protective layer.

20 Claims, 14 Drawing Sheets

(56) References Cited

FOREIGN PATENT DOCUMENTS

| | | |
|---|---|---|
| CN | 1739877 A | 3/2006 |
| CN | 202217683 U | 5/2012 |
| CN | 202230217 U | 5/2012 |
| CN | 102760782 A | 10/2012 |
| CN | 103561879 A | 2/2014 |
| CN | 204794852 U | 11/2015 |
| CN | 104158480 B | 9/2016 |
| CN | 206697500 U | 12/2017 |
| CN | 207994980 U | 10/2018 |
| CN | 208272919 U | 12/2018 |
| CN | 109150083 A | 1/2019 |
| CN | 208572012 U | 3/2019 |
| CN | 209200993 U | 8/2019 |
| CN | 110666456 A | 1/2020 |
| CN | 111064426 A | 4/2020 |
| CN | 211209641 U | 8/2020 |
| EA | 016066 B1 | 1/2012 |
| JP | H10308522 A | 11/1998 |
| JP | 2003147485 A | 5/2003 |
| JP | 2008102445 A | 5/2008 |
| JP | 2011101952 A | 5/2011 |
| JP | 2011176266 A | 9/2011 |
| JP | 2011253836 A | 12/2011 |
| JP | 2013038253 A | 2/2013 |
| JP | 2015018866 A | 1/2015 |
| JP | 2015101888 A | 6/2015 |
| JP | 2017037896 A | 2/2017 |
| JP | 2019519942 A | 7/2019 |
| WO | 2004028937 A3 | 8/2004 |
| WO | 2013172355 A1 | 11/2013 |
| WO | 2019000512 A1 | 1/2019 |

OTHER PUBLICATIONS

Jinko Solar Co., Ltd., et al., Extended European Search Report, EP 20205561.2, dated Apr. 21, 2021, 9 pgs.
Jinko Solar Co., Ltd., et al., JP First Office Action with English translation, JP 2020-178161, dated Jan. 12, 2021, 19 pgs.
Jinko Solar Co., Ltd., et al., JP Decision of Refusal with English translation, JP 2020-178161, dated Apr. 19, 2021, 16 pgs.
Jinko Solar Co., Ltd., et al., JP Decision to Grant with English translation, JP 2020-178161, dated Sep. 30, 2021, 5 pgs.
Jinko Solar Co., Ltd. et al, CN First Office Action with English translation, CN 202011061500.8, dated May 14, 2021, 28 pgs.
Jinko Solar Co , Ltd. et al, CN Notification to Grant with English translation, CN 202011061500.8, dated Sep. 24, 2021, 7 pgs.

* cited by examiner

PHOTOVOLTAIC FRAME, PHOTOVOLTAIC MODULE AND METHOD FOR MANUFACTURING PHOTOVOLTAIC FRAME

CROSS-REFERENCE TO RELATED APPLICATION

The present application is a continuation of U.S. patent application Ser. No. 17/092,174, filed on Nov. 6, 2020, claiming the benefit of priority under the Paris Convention to Chinese Patent Application No. 202011061500.8 filed Sep. 30, 2020, each of which is incorporated herein by reference in its entirety.

TECHNICAL FIELD

The embodiments of the present disclosure relate to the field of photovoltaic module technology, in particular to a photovoltaic frame, a photovoltaic module and a method for manufacturing the photovoltaic frame.

BACKGROUND

Generally, a frame is installed around a photovoltaic module, an edge of a solar cell laminate is accommodated in a notch of the frame, and the photovoltaic module is installed on a bracket through the frame. The frame of the photovoltaic module plays a role in enhancing the strength of the module and sealing the edge of the module.

At present, in order to adapt to the development of photovoltaic modules, various photovoltaic frames have appeared. However, the existing production process of photovoltaic frame is complicated and costly, and the quality of the photovoltaic frame needs to be improved. Therefore, how to improve the quality of the photovoltaic frame while meeting the requirements of the shape and structure of the finished product without adding too many process steps has become an urgent problem to be solved in the design and manufacturing process of photovoltaic solar modules.

SUMMARY

Some embodiments of the present disclosure provide a photovoltaic frame, a photovoltaic module, and a method for manufacturing the photovoltaic frame, which can improve the stability of the photovoltaic frame while increasing production efficiency of the photovoltaic frame and reducing production cost.

In order to solve the above technical problems, an embodiment of the present disclosure provides a photovoltaic frame, including: a top support portion, a bottom support portion and a transverse edge portion, where the top support portion and the transverse edge portion enclose a holding slot, and the top support portion has a bearing surface facing the holding slot, the bottom support portion is arranged opposite to the top support portion, and the transverse edge portion is located at one side of the top support portion away from the bottom support portion; and the photovoltaic frame is molded by a carbon steel sheet material after processing.

In some embodiments, the carbon steel sheet material contains a carbon, and a mass fraction of the carbon is in a range of 0.04% to 0.25%.

In some embodiments, the carbon steel sheet material further contains at least one of silicon, manganese, phosphorus or sulfur, and a mass fraction of the silicon is less than or equal to 0.5%, a mass fraction of the manganese is less than or equal to 0.6%, a mass fraction of the phosphorus is less than or equal to 0.1%, and a mass fraction of the sulfur is less than or equal to 0.045%.

In some embodiments, a strength of the carbon steel sheet material is in a range of 200 MPa to 600 MPa.

In addition, a percentage of breaking elongation of the carbon steel sheet material is within a range of 15% to 36%.

In some embodiments, the photovoltaic frame further includes: a first side edge portion and a second side edge portion; the top support portion, the second side edge portion and the transverse edge portion enclosing the holding slot; and the first side edge portion connecting the top support portion and the bottom support portion.

In some embodiments, the photovoltaic frame further includes: a third side edge portion, the third side edge portion connecting the top support portion and the bottom support portion, and the third side edge portion, the first side edge portion, the top support portion and the bottom support portion enclosing a closed cavity.

In some embodiments, the photovoltaic frame further includes: a weather-resistant protective layer covering at least an outer surface of at least one of the top support portion, the bottom support portion, the first side edge portion, the second side edge portion or the transverse edge portion, where the weather-resistant protective layer includes an alloy plating layer or an organic film layer.

In some embodiments, the weather-resistant protective layer further covers at least part of an inner wall surface of the closed cavity; the inner wall surface includes: a first surface, which is a surface of the first side edge portion facing the third side edge portion; a second face, which is a surface of the third side edge portion facing the first side edge portion; a third face, which is a surface of the top support portion facing the bottom support portion; a fourth surface, which is a surface of the bottom support portion facing the top support portion; the weather-resistant protective layer covers only the first surface and the second surface.

In some embodiments, the weather-resistant protective layer includes: a first weather-resistant protective layer, covering an outer surface of at least one of the top support portion, the bottom support portion, the first side edge portion, the second side edge portion or the transverse edge portion; a second weather-resistant protective layer, covering at least part of the inner wall surface of the closed cavity, and a thickness of the second weather-resistant protective layer is smaller than a thickness of the first weather-resistant protective layer.

In some embodiments, the second side edge portion includes a first inner surface and a first outer surface which are opposite to each other, and the first inner surface is an inner wall of the holding slot; the transverse edge portion includes a second inner surface and a second outer surface which are opposite to each other, and the second inner surface faces the top support portion; the top support portion includes a third inner surface and a third outer surface which are opposite to each other, and the third inner surface faces the transverse edge portion; the weather-resistant protective layer includes a first protective layer, covering the first inner surface, the second inner surface and the third inner surface; a second protective layer, covering the first outer surface, the second outer surface and the third outer surface, and a thickness of the second protective layer is greater than a thickness of the first protective layer.

In some embodiments, the photovoltaic frame further includes: a foaming layer filled in the closed cavity, where a material of the foaming layer is an organic foaming material or an inorganic foaming material.

In some embodiments, the photovoltaic frame further includes: a reinforcing rib located on the inner wall surface of the closed cavity.

In some embodiments, the photovoltaic frame is molded by the carbon steel sheet material after processing, including: the photovoltaic frame is molded by extruding and stretching the carbon steel sheet material.

In some embodiments, the photovoltaic frame is molded by the carbon steel sheet material after processing, including: the photovoltaic frame is molded by cold roll forming the carbon steel sheet material.

In some embodiments, the photovoltaic frame is molded by the carbon steel sheet material after processing, including: the carbon steel sheet material including a plurality of portions to be bent, and the photovoltaic frame being molded by bending the portions to be bent of the carbon steel sheet material; the carbon steel sheet material including a top surface and a bottom surface which are oppositely arranged; the portion to be bent having at least one groove recessed from the top surface toward the bottom surface; an extending direction of each of the portions to be bent being a first direction; and an extending direction of a top opening of the groove being the same as the first direction.

In some embodiments, the portion to be bent has one groove, and the groove extends from one end of the carbon steel sheet material to the other end along the first direction.

In some embodiments, the portion to be bent has a plurality of the grooves, and the plurality of the grooves are arranged at intervals along the first direction.

In some embodiments, the carbon steel sheet material includes a first side surface and a second side surface connecting the top surface and the bottom surface, and the first side surface is opposite to the second side surface; the groove at least includes a first groove, which penetrates through the first side surface; and the second groove, which penetrates through the second side surface.

In some embodiments, the photovoltaic frame further includes: a bending portion, where the bending portion connects two adjacent connection portions, and a plurality of the connection portions are sequentially connected to form the top support portion, the bottom support portion, the first side edge portion, the second side edge portion and the transverse edge portion; the bending portion includes two abutting side surfaces; and the bending portion and the plurality of the connection portions are integrally formed.

In some embodiments, the two abutting side surfaces of the bending portion are attached to each other; or, the two abutting side surfaces of the bending portion include: two contact surfaces which are attached to each other; a connection surface connected with each of the contact surfaces, with a gap between the two opposite connection surfaces.

In some embodiments, each of the connection portions is made of the carbon steel sheet material of a single layer; or, at least two of the adjacent connection portions have an overlapping part, and the overlapping part is composed of the carbon steel sheet material of at least two layers.

In addition, the two abutting side surfaces of the bending portion are reinforced by a preset manner, and the preset manner includes any one or more of a welding fixing, a riveting fixing or a mortise and tenon fixing.

In some embodiments, a thickness of the carbon steel sheet material is in a range of 0.2 mm to 2 mm.

In some embodiments, any one of a thickness of the top support portion, a thickness of the bottom support portion, a thickness of the first side edge portion, a thickness of the second side edge portion and a thickness of the transverse edge portion is a frame thickness, and a ratio of the frame thickness to the thickness of the carbon steel sheet material is in a range of 1 to 4.

In some embodiments, an included angle between any two adjacent ones of the top support portion, the bottom support portion, the first side edge portion, the second side edge portion and the transverse edge portion is in a range of 20-160.

Accordingly, an embodiment of the present disclosure further provides a photovoltaic module, including a stacked structure and the photovoltaic frame according to any of the above embodiments, where the stacked structure includes a panel, a first adhesive film, a cell piece, a second adhesive film and a backplane which are sequentially stacked.

In some embodiments, the backplane includes a glass or an organic backplane.

In some embodiments, the panel includes a long side edge and a short side edge adjacent to each other, where a length of the long side edge is greater than or equal to 2 m, and a length of the short side edge is greater than or equal to 1 m.

Accordingly, an embodiment of the present disclosure further provides a method for manufacturing a photovoltaic frame, including: providing a carbon steel sheet material; forming the photovoltaic frame by processing and molding the carbon steel sheet material, the photovoltaic frame including: a top support portion, a bottom support portion, a first side edge portion, a second side edge portion and a transverse edge portion, where the top support portion, the second side edge portion, and the transverse edge portion enclose a holding slot, and the top support portion has a bearing surface facing the holding slot, the bottom support portion is arranged opposite to the top support portion, and the transverse edge portion is located one side of the top support portion away from the bottom support portion; the first side edge portion connects the top support portion and the bottom support portion.

In some embodiments, the processing adopts a calendaring and cold roll forming process.

In some embodiments, the carbon steel sheet material includes a plurality of portions to be bent, the carbon steel sheet material includes a top surface and a bottom surface which are oppositely arranged; the portions to be bent have at least one groove recessed from the top surface toward the bottom surface, an extending direction of each of the portions to be bent is a first direction, and an extending direction of a top opening of the groove is the same as the first direction; the processing includes: bending the portion to be bent to form the photovoltaic frame.

Compared with related technologies, the technical solution provided by the embodiment of the present disclosure has the following advantages.

The photovoltaic frame is molded by selecting the carbon steel sheet material after processing. Since the strength of the carbon steel sheet material may reach more than three times the strength of the aluminum material, the structural strength of the photovoltaic frame is enhanced, thereby improving the stability of the photovoltaic frame. In addition, due to the high structural strength of the photovoltaic frame, the present disclosure does not need to set a height of the photovoltaic frame higher to adapt to a large-sized photovoltaic module, thereby effectively reducing the thickness and weight of the photovoltaic frame, improving a production efficiency of the photovoltaic frame and reducing a production cost of the photovoltaic frame.

BRIEF DESCRIPTION OF THE DRAWINGS

One or more embodiments are described as examples with reference to the corresponding figures in the accompanying

DETAILED DESCRIPTION

According to the background technology, the production efficiency of a photovoltaic frame is low and the cost is high.

Through an analysis, it is found that the main reasons include: the strength of the existing aluminum frame is limited. Throughout the development history of photovoltaic modules, the size of the photovoltaic module has changed from 250*175*25 mm to the current 1950*995*45 mm. That is to say, the size of the photovoltaic module is constantly increasing, and will develop towards larger size in the future. However, with the increasing size of the photovoltaic module, the size of an aluminum photovoltaic module frame is developing towards the direction of a larger frame section and thicker thickness. The essential reason for this phenomenon is the low strength of the aluminum material itself. When the module size is increased, using an aluminum alloy material to make a section steel, the frame section of the module needs to be reinforced by a structure with larger section and thicker thickness, which may increase the use cost.

To solve the above problems, the present disclosure provides a photovoltaic frame, a photovoltaic module and a method for manufacturing the photovoltaic frame. The photovoltaic frame in an embodiment of the present disclosure is molded by a carbon steel sheet material after processing. The photovoltaic frame manufactured from the above sheet material can improve a production efficiency of the photovoltaic frame and reduce a production cost, while improving the stability of the photovoltaic frame, which facilitates the production and supply of a whole industrial chain.

The embodiments of the present disclosure will be described in detail below with reference to the accompanying drawings in order to make the objectives, technical solutions and advantages of the present disclosure clearer. However, it will be apparent to those skilled in the art that, in the various embodiments of the present disclosure, numerous technical details are set forth in order to provide the reader with a better understanding of the present disclosure. However, the technical solutions claimed in the present disclosure may be implemented without these technical details and various changes and modifications based on the following embodiments.

Figure 1:
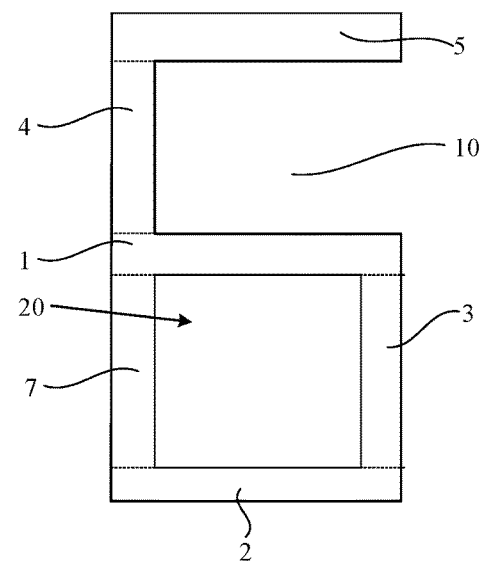
FIG. 1 is a sectional view of a photovoltaic frame provided according to a first embodiment of the present disclosure.

A first embodiment of the present disclosure relates to a photovoltaic frame. A specific structure is shown in FIG. 1, and includes: a top support portion 1, a bottom support portion 2, and a transverse edge portion 5; the top support portion 1 and the transverse edge portion 5 enclose a holding slot 10, and the top support portion 1 has a bearing surface 101 facing the holding slot 10, the bottom support portion 2 is arranged opposite to the top support portion 1, and the transverse edge portion 5 is located at one side of the top support portion 1 away from the bottom support portion 2. The photovoltaic frame is molded by a carbon steel sheet material after processing.

Specifically, as shown in FIG. 1, the photovoltaic frame further includes: a first side edge portion 3, a second side edge portion 4, and a third side edge portion 7; the top support portion 1, the second side edge portion 4 and the transverse edge portion 5 enclose the above holding slot 10; the first side edge portion 3 connects the top support portion 1 and the bottom support portion 2; the third side edge portion 7 connects the top support portion 1 and the bottom support portion 2; and the third side edge portion 7, the first side edge portion 3, the top support portion 1 and the bottom support portion 2 enclose a closed cavity 20. For convenience of marking and distinguishing, adjacent structures are separated by dotted lines in FIG. 1, and the dotted lines are not illustrated in subsequent figures.

As shown in FIG. 1, the bottom support portion 2 and the top support portion 1 have the same length. The photovoltaic frame is a photovoltaic frame without a C-edge.

Figure 2:
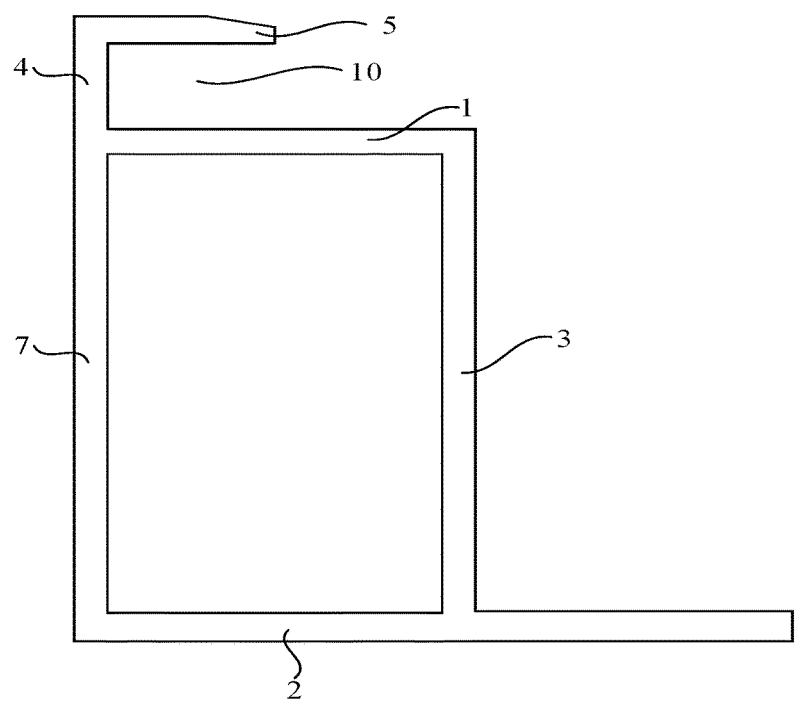
FIG. 2 is another sectional view of the photovoltaic frame provided according to the first embodiment of the present disclosure.

Please refer to FIG. 2, which is another sectional view of the photovoltaic frame of this embodiment. The photovoltaic frame further includes a third side edge portion 7. The third side edge portion 7 connects the top support portion 1 and the bottom support portion 2, and the third side edge portion 7 is connected with one side edge of the bottom support portion 2. A joint between the first side edge portion 3 and the bottom support portion 2 is spaced from the other side edge of the bottom support portion 2. Specifically, the photovoltaic frame shown in FIG. 2 is a photovoltaic frame with a C-edge (as shown in FIG. 2, the length of the bottom support portion 2 is greater than the length of the top support portion 1), and the photovoltaic frame shown in FIG. 1 is a photovoltaic frame without a C-edge. The structure of the photovoltaic frame is not specifically limited in this embodiment, and the photovoltaic frames with different structures may be designed according to actual needs, only by ensuring that the photovoltaic frame is molded by the carbon steel sheet material after processing.

It should be noted that, in other embodiments, the photovoltaic frame may also be an S-shaped frame, that is, the photovoltaic frame may not need to be provided with the above-described third side edge portion.

It is worth mentioning that the carbon steel sheet material in this embodiment contains carbon, and a mass fraction of the carbon is in a range of 0.04% to 0.25%. Since too low carbon content in the carbon steel sheet material may lead to a weak strength of the carbon steel sheet material, which is difficult to meet the structural strength requirements of the photovoltaic frame. The excessive carbon content in the carbon steel sheet material may lead to an increase in a salt spray corrosion rate of the carbon steel sheet material, which is difficult to meet the requirement of a warranty period of the photovoltaic frame. By using the carbon steel sheet material with this carbon content range to manufacture the photovoltaic frame, the strength of the photovoltaic frame may meet the design requirements without affecting the warranty period of the photovoltaic frame. The mass fraction of the carbon content in the carbon steel sheet material in this embodiment is preferably 0.12% or 0.13%. Using the carbon steel sheet material with such a carbon content value to manufacture the photovoltaic frame may make the photovoltaic frame have stronger strength and longer warranty period.

In addition, the carbon steel sheet material may further contain at least one of silicon, manganese, phosphorus or sulfur, and a mass fraction of the silicon is less than or equal to 0.5%, a mass fraction of the manganese is less than or equal to 0.6%, a mass fraction of the phosphorus is less than or equal to 0.1%, and a mass fraction of the sulfur is less than or equal to 0.045%.

Specifically, the carbon steel sheet material has a small amount of sulfur element or phosphorus element, which may enhance the strength and hardness of the carbon steel sheet material, and improve the formability and processing property of the carbon steel sheet material, such as a cold roll forming formability, a bending property or a cutting processing property of the carbon steel sheet material. If the content of the sulfur element or the phosphorus element is too high, a toughness of the carbon steel sheet material may be reduced correspondingly, which easily leads to a problem of brittle fracture. Therefore, the mass fraction of the phosphorus is less than or equal to 0.1%, such as 0.01%, 0.05% and 0.08%; the mass fraction of the sulfur is less than or equal to 0.045%, such as 0.015%, 0.02% and 0.04%. By doping the phosphorus or the sulfur with the above content, the strength and hardness of the carbon steel sheet material are improved, while preventing the toughness of the carbon steel sheet material from being too low. Adding a manganese element or a silicon element as a deoxidizer in the process of manufacturing the carbon steel sheet material may reduce an iron oxide into an iron and prevent the carbon steel sheet material from becoming brittle. In addition, a proper amount of the manganese element or the silicon element may bring a solid solution strengthening effect. The solid solution strengthening refers to a phenomenon that the strength and hardness of a pure metal are improved after proper alloying. The solid solution strengthening may improve the strength and hardness of the carbon steel sheet material, which makes the property of the carbon steel sheet material better, and is more conductive to improving a cold roll forming or a grooving and bending forming to make a photovoltaic frame with excellent property, thus further avoiding problems such as the fracture in the forming process. If the content of the manganese element or the silicon element is too high, a corrosion resistance and a welding property of the carbon steel sheet material may be weakened. Therefore, in this embodiment, the mass fraction of the silicon is less than or equal to 0.5%, such as 0.1%, 0.25%, and 0.4%. The mass fraction of the manganese is less than or equal to 0.6%, such as 0.01%, 0.4% and 0.5%. By doping the silicon or the manganese with the above content, in addition to ensuring that the carbon steel sheet material has good strength and hardness characteristics, the carbon steel sheet material also has good corrosion resistance and welding property.

It should be noted that the aforementioned mass fraction refers to a ratio of a relative atomic mass (need to multiply a coefficient) of each atom in a compound to a total formula weight, that is, a proportion of an element in a certain substance. For example, the mass fraction of the carbon refers to a proportion of the carbon element in the carbon steel sheet material.

Preferably, the strength of the carbon steel sheet material is in a range of 200 MPa to 600 MPa. The strength of the carbon steel sheet material represents a mechanical property of the carbon steel sheet material against fracture and excessive deformation. By adopting the carbon steel sheet material with such strength range, the manufactured photovoltaic frame may meet the design requirements and is not easy to deform under an action of an external force, which improves the stability of the photovoltaic frame. The strength of the carbon steel sheet material in this embodiment is preferably 300 MPa or 400 MPa. The photovoltaic frame manufactured by the carbon steel sheet material with such strength may make the photovoltaic frame more stable.

More preferably, a percentage of breaking elongation of the carbon steel sheet material is within a range of 15% to 36%. When the carbon steel sheet material is subjected to the external force to break, a ratio of an elongation length after stretching to a length before stretching is the percentage of breaking elongation of the carbon steel sheet material. By adopting the carbon steel sheet material with such percentage of breaking elongation range, the manufactured photovoltaic frame may meet the design requirements, has a certain deformation capability, and does not break after a slight deformation, which improves the stability of the photovoltaic frame. The percentage of breaking elongation of the carbon steel sheet material in this embodiment is preferably 25% or 26%. The photovoltaic frame manufactured by the carbon steel sheet material with such percentage of breaking elongation may make the photovoltaic frame more stable.

Compared with related technologies, the photovoltaic frame is molded by selecting the carbon steel sheet material after processing. Since the strength of the carbon steel sheet material may reach more than three times the strength of the aluminum material, the structural strength of the photovoltaic frame is enhanced, thereby improving the stability of the photovoltaic frame. In addition, due to the high structural strength of the photovoltaic frame, the present disclosure does not need to set a height of the photovoltaic frame higher to adapt to a large-sized photovoltaic module, thereby effectively reducing the thickness and weight of the photovoltaic frame, improving a production efficiency of the photovoltaic frame and reducing a production cost of the photovoltaic frame.

It should be noted that a thickness of the carbon steel sheet material in this embodiment is in a range of 0.2 mm to 2 mm. The carbon steel sheet material with such a thickness range may reduce the production cost of the photovoltaic frame while ensuring the strength of the photovoltaic frame. The thickness of the carbon steel sheet material in this embodiment is preferably 0.6-1 mm. Adopting the carbon steel sheet material with such thickness to manufacture the photovoltaic frame may reduce the production cost of the photovoltaic frame as much as possible while ensuring the strength of the photovoltaic frame.

It is worth mentioning that any one of a thickness of the top support portion 1, a thickness of the bottom support portion 2, a thickness of the first side edge portion 3, a thickness of the second side edge portion 4 and a thickness of the transverse edge portion 5 is a frame thickness, and a ratio of the frame thickness to the thickness of the carbon steel sheet material is in a range of 1 to 4. That is to say, after the photovoltaic frame is molded in this embodiment, the thickness of the frame is not limited to the same everywhere. The carbon steel sheet material may be folded and extruded by calendaring, so that the ratio of the thickness of the top support portion 1, the bottom support portion 2, the first side edge portion 3, the second side edge portion 4 and the transverse edge portion 5 to the thickness of the carbon steel sheet material is in the range of 1 to 4. With the arrangement of such structure, the shape and structure of the photovoltaic frame are diversified, which may meet various design requirements. It should be noted that, in practical applications, the specific structure of the photovoltaic frame is not limited to only having the top support portion 1, the bottom support portion 2, the first side edge portion 3, the second side edge portion 4 and the transverse edge portion 5, but may also have other structures. When the photovoltaic frame has other structures, the ratio of the frame thickness of the structure to the thickness of the carbon steel sheet material is also in the range of 1 to 4.

Specifically, an included angle between any two adjacent ones of the top support portion 1, the bottom support portion 2, the first side edge portion 3, the second side edge portion 4 and the transverse edge portion 5 is in a range of 20-160 degree. With the arrangement of such structure, the shape and structure of the photovoltaic frame are diversified, which may meet various design requirements.

It may be understood that the photovoltaic frame in this embodiment is molded by the carbon steel sheet material after processing. Specifically, the photovoltaic frame is molded by extruding and stretching the carbon steel sheet material. In this way, the manufacturing process of the photovoltaic frame is simple, the cost is low, and there is no pollution in the manufacturing process. Specifically, the photovoltaic frame is molded by cold roll forming the carbon steel sheet material. The cold roll forming process is to mechanically bend the carbon steel sheet material into a profile with a certain shape and size at room temperature. The advantages of the cold roll forming are: it may produce all kinds of extremely thin, extremely wide and complex profiles that may not be produced by rolling; it saves metal materials; the mechanical property of the products is good. Commonly used cold roll forming processing methods include a roll bending, a press bending, a drawing bending and a bending.

A second embodiment of the present disclosure relates to a photovoltaic frame, and this embodiment is further improved on the basis of the first embodiment. The specific improvement lies in that the photovoltaic frame in this embodiment further includes a weather-resistant protective layer, which at least covers an outer surface of at least one of a top support portion, a bottom support portion, a first side edge portion, a second side edge portion or a transverse edge portion, so as to further improve the reliability of the photovoltaic frame.

Figure 3:
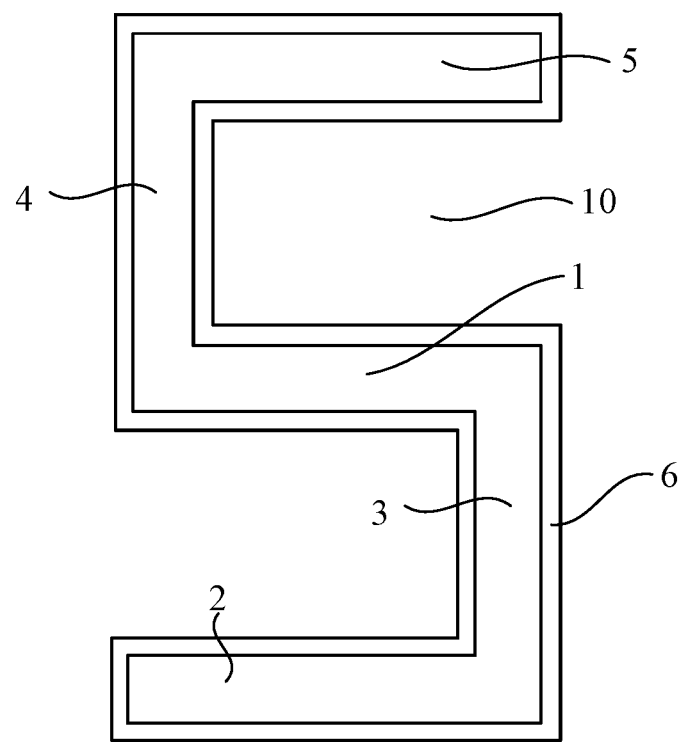
FIG. 3 is a sectional view of a photovoltaic frame provided according to a second embodiment of the present disclosure.

Please refer to FIG. 3, which is a schematic structural diagram of the photovoltaic frame. A weather-resistant protective layer 6 covers the outer surfaces of a top support portion 1, a bottom support portion 2, a first side edge portion 3, a second side edge portion 4 and a transverse edge portion 5. The weather-resistant protective layer 6 includes an alloy plating layer or an organic film layer. Through an arrangement with such structure, a carbon steel may be prevented from contacting an external environment, so that the photovoltaic frame is difficult to be corroded by external water, oxygen or other substances, a service life of the photovoltaic frame is prolonged, and the problems of easy corrosion and short service life of the carbon steel sheet material are fundamentally solved.

It should be noted that the outer surfaces of the top support portion 1, the bottom support portion 2, the first side edge portion 3, the second side edge portion 4 and the transverse edge portion 5 shown in FIG. 3 are all covered by the weather-resistant protective layer 6. In practical applications, the weather-resistant protective layer 6 may only cover the outer surfaces which are in contact with the external environment among the top support portion 1, the bottom support portion 2, the first side edge portion 3, the second side edge portion 4 and the transverse edge portion 5 (for example, it may only cover the top support portion 1, the bottom support portion 2 and the transverse edge portion 5), so as to reduce the production cost of the photovoltaic frame while ensuring that the photovoltaic frame is difficult to be corroded by external water, oxygen or other substances and the service life of the photovoltaic frame is prolonged.

It is worth mentioning that, as shown in FIGS. 4-7, a position and thickness of the weather-resistant protective layer 6 in this embodiment may be set according to actual requirements, so as to obtain a photovoltaic frame that meets the requirements. For the convenience of understanding, the photovoltaic frames shown in FIGS. 4-7 are specifically described below.

Figure 4:
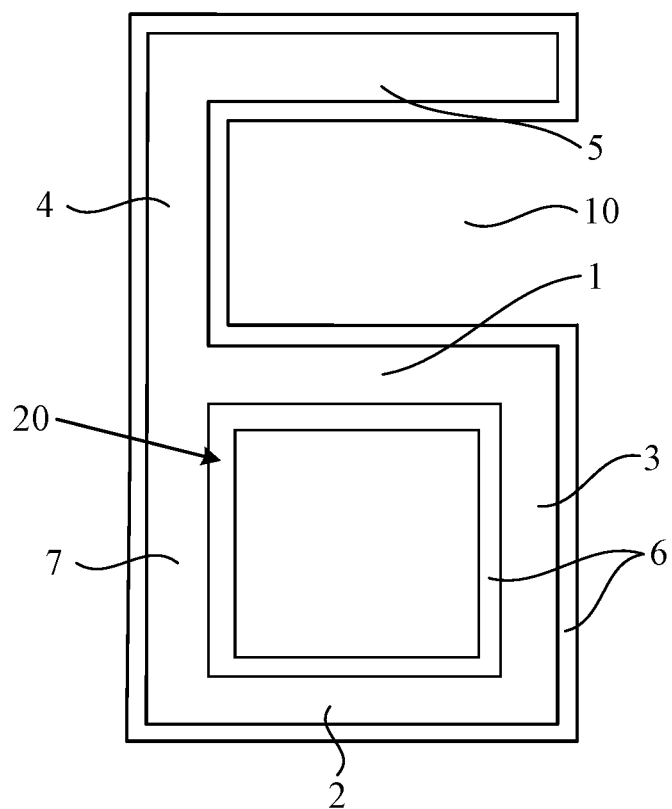
FIG. 4 is a sectional view of a photovoltaic frame with another structure provided according to the second embodiment of the present disclosure.

Please refer to FIG. 4, which is a sectional view of a photovoltaic frame in a feasible embodiment. The photovoltaic frame further includes a third side edge portion 7, which connects the top support portion 1 and the bottom support portion 2. The third side edge portion 7, the first side edge portion 3, the top support portion 1 and the bottom support portion 2 enclose a closed cavity 20. The weather-resistant protective layer 6 further covers an inner wall surface of the closed cavity 20.

Since the photovoltaic frame is usually of a hollow structure, that is, the closed cavity 20 is also in contact with the external environment. By covering the inner wall surface of the closed cavity 20 with the weather-resistant protective layer 6, the inner wall surface of the closed cavity 20 may not be corroded by external water, oxygen or other substances, thus further prolonging a service life of the photovoltaic frame.

It can be understood that in the photovoltaic frame shown in FIG. 4, the weather-resistant protective layer 6 covers all the inner wall surfaces 201 of the closed cavity 20. However, in practical applications, the weather-resistant protective layer 6 may only cover some inner wall surfaces 201 of the closed cavity 20. The specific structure is shown in FIG. 5.

Figure 5:
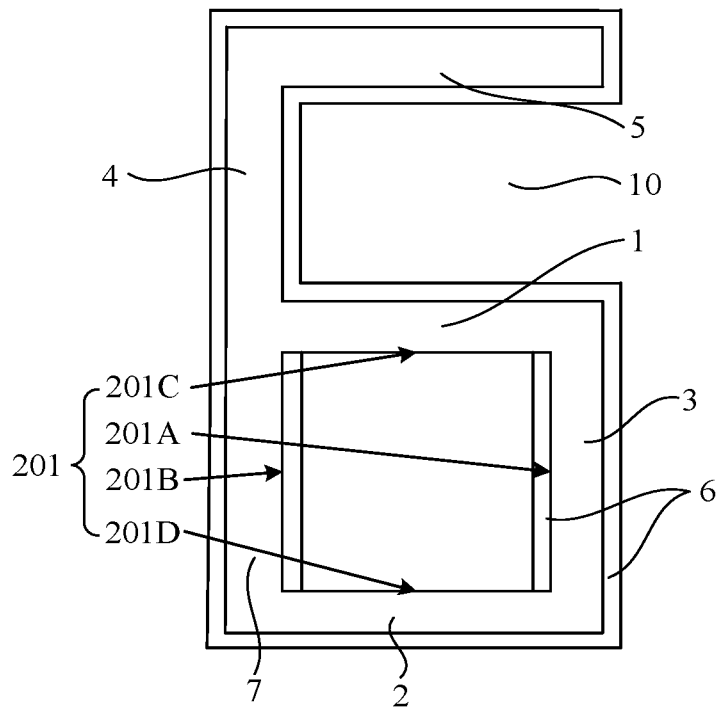
FIG. 5 is a sectional view of a photovoltaic frame with another structure provided according to the second embodiment of the present disclosure.

Referring to FIG. 5, the inner wall surface 201 includes: a first surface 201A, which is a surface of the first side edge portion 3 facing the third side edge portion 7; a second surface 201B, which is a surface of the third side edge portion 7 facing the first side edge portion 3; a third surface 201C, which is a surface of the top support portion 1 facing the bottom support portion 2; and a fourth surface 201D, which is a surface of the bottom support portion 2 facing the top support portion 1. The weather-resistant protective layer 6 covers only the first surface 201A and the second surface 201B.

Generally speaking, a surface area of the first surface 201A and the second surface 201B of the photovoltaic frame is larger than that of the third surface 201C and the fourth surface 201D, resulting in that the first surface 201A and the second surface 201B have a larger contact surface with the external environment, and are more vulnerable to be corroded by external water, oxygen or other substances. The weather resistant protective layer 6 is set to only cover the first side 201A and the second side 201B, so that the production cost of the photovoltaic frame is reduced while ensuring that the inner wall surface 201 is difficult to be corroded by external water, oxygen or other substances, and the service life of the photovoltaic frame is prolonged.

Figure 6:
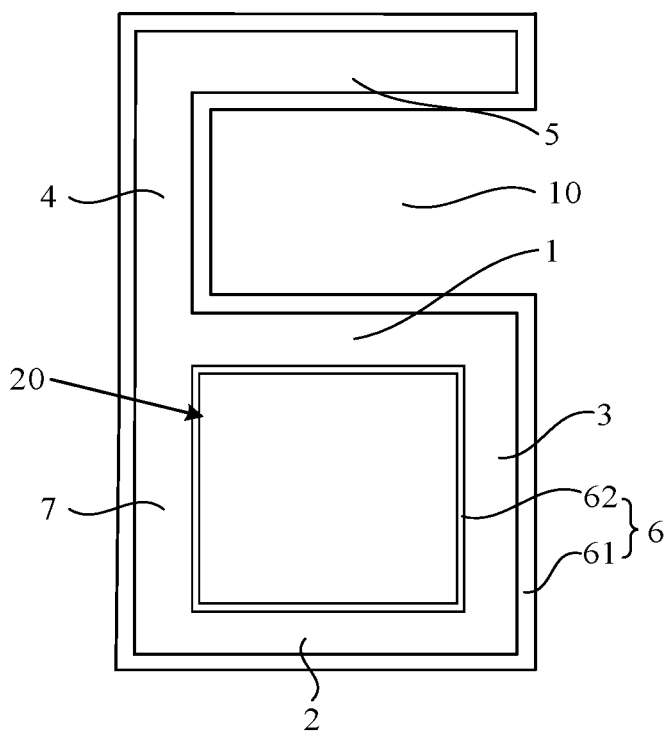
FIG. 6 is a sectional view of a photovoltaic frame with another structure provided according to the second embodiment of the present disclosure.

Referring to FIG. 6, the weather-resistant protective layer 6 includes a first weather-resistant protective layer 61 covering an outer surface of the top support portion 1, the bottom support portion 2, the first side edge portion 3, the second side edge portion 4 or the transverse edge portion 5; a second weather-resistant protective layer 62 covering the inner wall surface 201 of the closed cavity 20, and a thickness of the second weather-resistant protective layer 62 is smaller than a thickness of the first weather-resistant protective layer 61. Compared with the inner wall surface 201, the outer surface of the photovoltaic frame is more easily to be corroded by external water, oxygen or other substances, and the thicker the weather-resistant protective layer 6 is, the stronger its protection ability will be, but the production cost of the weather-resistant protective layer 6 may be higher. Therefore, an arrangement with such structure may ensure that the outer surface and the inner wall surface 201 of the photovoltaic frame are not corroded by external water, oxygen or other substances, while further reducing the production cost of the photovoltaic frame.

It can be understood that the outer surfaces of the top support portion 1, the bottom support portion 2, the first side edge portion 3, the second side edge portion 4 and the transverse edge portion 5 shown in FIG. 6 are all covered by the weather-resistant protective layer 6. In practical applications, the weather-resistant protective layer 6 may only cover the outer surfaces which are in contact with the external environment among the top support portion 1, the bottom support portion 2, the first side edge portion 3, the second side edge portion 4 and the transverse edge portion 5. The weather-resistant protective layer 6 shown in FIG. 6 also covers all the inner wall surfaces 201 of the closed cavity 20, but in practical applications, the weather-resistant protective layer 6 may only cover some inner wall surfaces 201 of the closed cavity 20.

It is worth mentioning that a grammage of the first weather-resistant protective layer 61 in this embodiment is in a range of 20 g/m$^2$ to 500 g/m$^2$. In this way, the production cost of the first weather-resistant protective layer 61 may be effectively controlled while ensuring that the first weather-resistant protective layer 61 may isolate the external water, oxygen or other substances, and the property of the photovoltaic frame may not be affected due to the excessive thickness of the first weather-resistant protective layer 61. Preferably, the grammage of the first weather-resistant protective layer 61 is 260 g/m$^2$ or 900 g/m$^2$. The first weather-resistant protective layer 61 in this grammage range may ensure that the first weather-resistant protective layer 61 isolates the external water, oxygen or other substances while reducing the production cost of the first weather-resistant protective layer 61 as much as possible.

In this embodiment, a grammage of the second weather-resistant protective layer 62 is in a range of 0 g/m$^2$ to 500 g/m$^2$. In this way, the production cost of the second weather-resistant protective layer 62 may be effectively controlled while ensuring that the second weather-resistant protective layer 62 may isolate the external water, oxygen or other substances. Preferably, the grammage of the second weather-resistant protective layer 62 is 240 g/m$^2$ or 250 g/m$^2$. The second weather-resistant protective layer 62 in this grammage range may ensure that the second weather-resistant protective layer 62 isolates the external water, oxygen or other substances while reducing the production cost of the second weather-resistant protective layer 62 as much as possible, without making the thickness of the second weather-resistant protective layer 62 exceed the thickness of the first weather-resistant protective layer 61.

Figure 7:
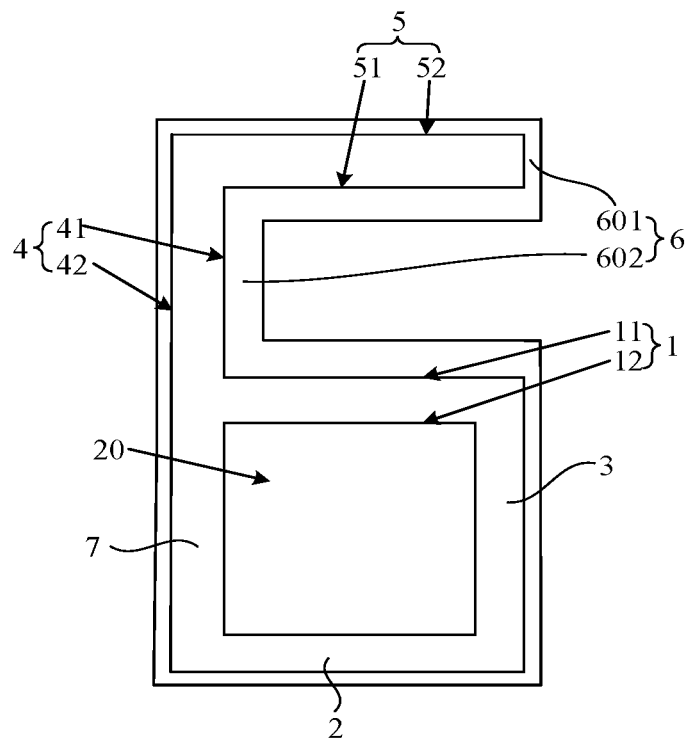
FIG. 7 is a sectional view of a photovoltaic frame with another structure provided according to the second embodiment of the present disclosure.

Referring to FIG. 7, the second side edge portion 4 includes a first inner surface 41 and a first outer surface 42 which are opposite to each other, and the first inner surface 41 is an inner wall of the holding slot 10. The transverse edge portion 5 includes a second inner surface 51 and a second outer surface 52 which are opposite to each other, and the second inner surface 51 faces the top support portion 1. The top support portion 1 includes a third inner surface 11 and a third outer surface 12 which are opposite to each other, and the third inner surface 11 faces the transverse edge portion 5. The weather-resistant protective layer 6 includes a first protective layer 601 covering the first inner surface 41, the second inner surface 51 and the third inner surface 11; a second protective layer 602 covering the first outer surface 42, the second outer surface 52 and the third outer surface 12, and a thickness of the second protective layer 602 is greater than a thickness of the first protective layer 601. Since the holding slot 10 is usually used to hold a photovoltaic module, that is, the inner wall of the holding slot 10 may contact with the photovoltaic module, which may cause the second protective layer 602 provided on the inner wall of the holding slot 10 to be worn, thus causing the function of the second protective layer 602 to be affected. Through an arrangement with such structure, the second protective layer 602 may still play its due protective function (i.e., isolate the external water, oxygen or other substances from contacting the inner wall of the holding slot 10) even if it is worn after contacting with the photovoltaic modules, thereby further improving the reliability of the photovoltaic frame.

With reference to FIGS. 4 to 7, the weather-resistant protective layer 6 is an alloy plating layer, and the material of the alloy plating layer includes any one or more of galvanization, galvanized aluminum or galvanized magnesium aluminum. In addition, the weather-resistant protective layer 6 of this embodiment may also be an organic film layer, and the material of the organic film layer includes any one or more of polyethylene, polyvinylidene fluoride, polyurethane, polyvinyl chloride or silane-modified polymer.

A third embodiment of the present disclosure relates to a photovoltaic frame, and this embodiment is further improved on the basis of the first embodiment. The specific improvement lies in that the photovoltaic frame further has a closed cavity 20, and the closed cavity 20 is filled with a foaming layer 20A to further improve the stability of the photovoltaic frame.

Figure 8:
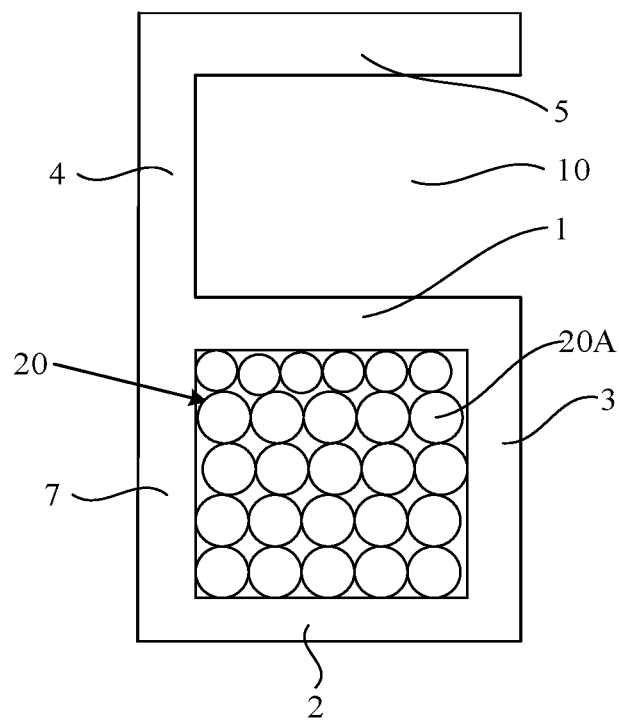
FIG. 8 is a sectional view of a photovoltaic frame provided according to a third embodiment of the present disclosure.

Referring to FIG. 8, the photovoltaic frame includes a third side edge portion 7, which connects a top support portion 1 and a bottom support portion 2, and the third side edge portion 7, a first side edge portion 3, the top support portion 1 and the bottom support portion 2 enclose the closed cavity 20; the foaming layer 20A is filled in the closed cavity 20. The foaming layer 20A with a high strength and a good adhesion is arranged in the closed cavity 20, so that the foaming layer 20A and the photovoltaic frame made of a carbon steel bear a force together, thereby further enhancing a yield strength of the photovoltaic frame.

Herein, the material of the foaming layer 20A is an organic foaming material or an inorganic foaming material, preferably made of a rigid polyurethane foaming plastic or an unsaturated polyester plastic. The unsaturated polyester plastic includes a component A and a component B, where the component A includes an unsaturated polyester resin, a thickener, an initiator and a filler, and the component B is a glass fiber coarse sand or a glass fiber mat.

Specifically, the polyurethane foaming plastic in the present disclosure, referred to as a rigid polyurethane foam for short, has excellent properties such as a light weight, a high strength, a good dimensional stability, a strong adhesive force, and has a good adhesive strength to metals such as steel, aluminum and stainless steel, and most plastic materials such as wood, concrete and asphalt, etc. Moreover, since a closed cell rate of the rigid polyurethane is more than 95%, which belongs to a hydrophobic material, the photovoltaic frame in this embodiment has moisture-proof and waterproof properties. Furthermore, the polyurethane is a kind of flame-retardant self-extinguishing material after adding a flame retardant, and its softening point may reach above 250° C., so that the photovoltaic frame in this embodiment has properties of fireproof, flame retardant and high-temperature resistance.

It is worth mentioning that a ratio of a volume of the foaming layer 20A to a volume of the closed cavity 20 shown in FIG. 8 is almost equal to 100%, that is, the foaming layer 20A fills the closed cavity 20. However, in practical applications, the foaming layer 20A may not fill the closed cavity 20, and the ratio of the volume of the foaming layer 20A to the volume of the closed cavity 20 is in a range of 60% to 100%. In this way, a yield strength of the photovoltaic frame may be improved while the production cost of the photovoltaic frame may be reduced. Preferably, the ratio of the volume of the foaming layer 20A to the volume of the closed cavity 20 is 80% or 85%. With the foaming layer 20A with such a volume ratio in the closed cavity 20, the photovoltaic frame has higher yield strength and lower production cost.

A fourth embodiment of the present disclosure relates to a photovoltaic frame, and this embodiment is further improved on the basis of the first embodiment. The specific improvement lies in that the photovoltaic frame further has a closed cavity 20 and a reinforcing rib 20B. The reinforcing rib 20B is located on an inner wall surface of the closed cavity 20 to further improve the stability of the photovoltaic frame.

Figure 9:
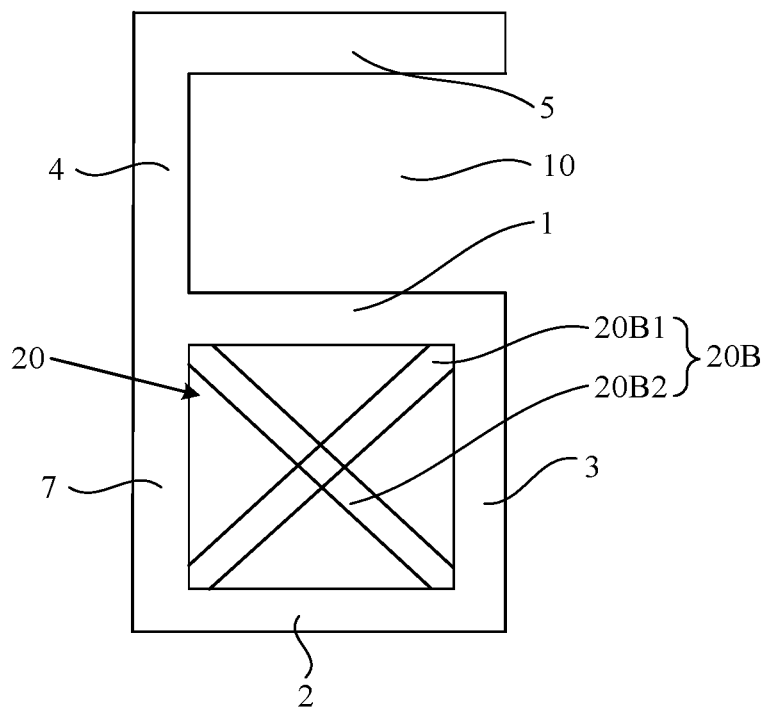
FIG. 9 is a sectional view of a photovoltaic frame provided according to a fourth embodiment of the present disclosure.

Referring to FIG. 9, the reinforcing rib 20B includes: a first reinforcing rib 20B1 and a second reinforcing ribs 20B2. The first reinforcing rib 20B1 connects a first vertex angle and a second vertex angle, where the first vertex angle is an included angle between a first side edge portion 3 and a top support portion 1, and the second vertex angle is an included angle between a third side edge portion 7 and a bottom support portion 2; The second reinforcing ribs 20B2 connects a third vertex angle and a fourth vertex angle, where the third vertex angle is an included angle between the first side edge portion 3 and the bottom support portion 2, and the fourth vertex angle is an included angle between the third side edge portion 7 and the bottom support portion 2. By providing the "X"-shaped reinforcing rib 20B, a strength of the photovoltaic frame may be further strengthened, and the hollow closed cavity 20 may be prevented from being deformed under an action of an external force.

It is worth mentioning that the number and setting position of the reinforcing rib 20B in this embodiment are not limited to this. The positions and numbers of other reinforcing ribs 20B which are arranged in the closed cavity 20 and may increase the strength of the closed cavity 20 may be set according to the actual needs, which are all within the protection scope of the present disclosure.

A fifth embodiment of the present disclosure relates to a photovoltaic frame, and this embodiment is further improved on the basis of the first embodiment. The specific improvement lies in that the photovoltaic frame further has a closed cavity 20 and a protrusion 20C. The protrusion 20C is located on an inner wall surface 201 of the closed cavity 20 to further enhance a strength of the photovoltaic frame.

Figure 10:
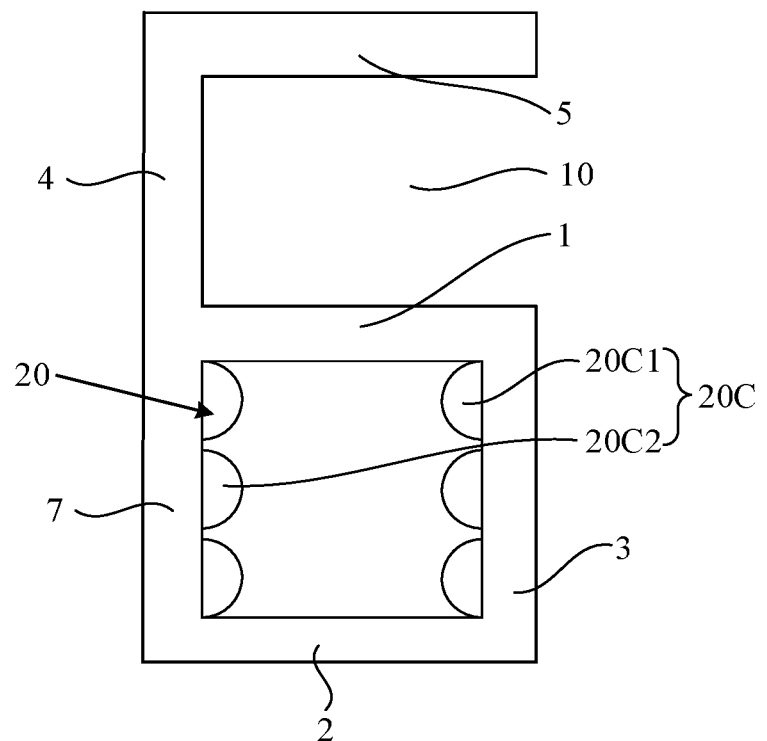
FIG. 10 is a sectional view of a photovoltaic frame provided according to a fifth embodiment of the present disclosure.

Referring to FIG. 10, the protrusion 20C includes: a first protrusion 20C1 and a second protrusion 20C2; the first protrusion 20C1 is provided on a surface of a first side edge portion 3 facing the third side edge portion 7; the second protrusion 20C2 is provided on a surface of a third side edge portion 7 facing the first side edge portion 3. It can be understood that the protrusion 20C shown in FIG. 9 is only provided on the surface of the first side edge portion 3 facing the third side edge portion 7, and the surface of the third side edge portion 7 facing the first side edge portion 3. In practical applications, the setting position of the protrusion 20C is not limited to this, and may also be provided on all other surfaces of the closed cavity, which is not specifically limited in this embodiment.

Preferably, a plurality of the first protrusions 20C1 are arranged at intervals on the surface of the first side edge portion 3 facing the third side edge portion 7; and a plurality of the second protrusions are arranged at intervals on the surface of the third side edge portion 7 facing the first side edge portion 1. Through an arrangement with such structure, the first side edge portion 3 and/or the third side edge 7 may be stressed evenly, thus further improving the stability of the photovoltaic frame.

More preferably, the number of the first protrusions 20C1 is the same as the number of the second protrusions 20C2. Through an arrangement with such structure, the two sides of the photovoltaic frame are stressed evenly, thus further improving the stability of the photovoltaic frame.

A sixth embodiment of the present disclosure relates to a carbon steel sheet material, and this embodiment is a further improvement of the first embodiment. The specific improvement lies in that in this embodiment, the carbon steel sheet material includes a plurality of portions to be bent 80, and a photovoltaic frame is molded by bending the portions to be bent 80 of the carbon steel sheet material. In this way, a production efficiency of the photovoltaic frame may be improved and a production process of the photovoltaic frame may be simplified.

Referring to FIGS. 11 to FIG. 17, in this embodiment, the carbon steel sheet material includes a top surface 81 and a bottom surface 82 which are oppositely arranged. The portion to be bent 80 has at least one groove 83 recessed from the top surface 81 toward the bottom surface 82. An extending direction of each of the portions to be bent 80 is a first direction, and an extending direction of a top opening of the groove 83 is the same as the first direction.

The following will be described in detail with reference to the accompanying drawings.

Figure 11:
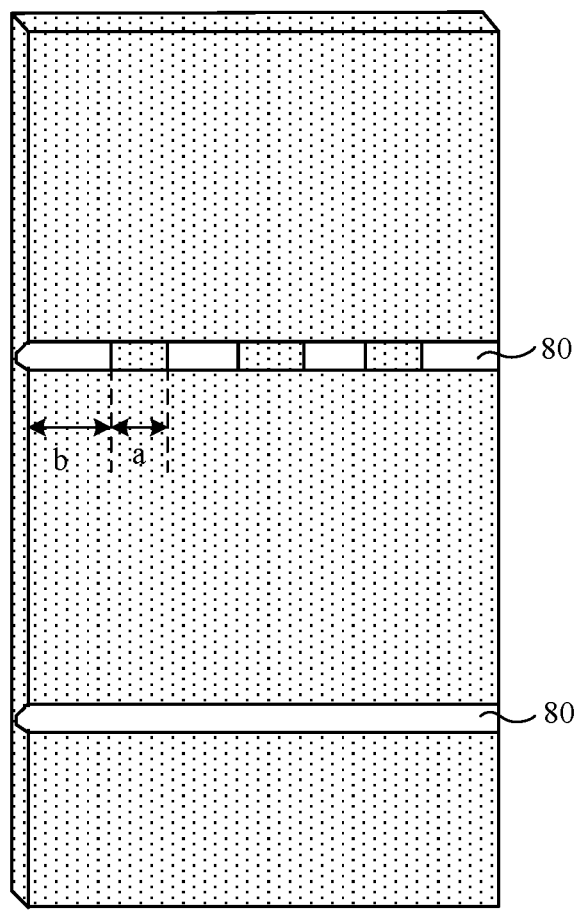
FIG. 11 is a schematic structural diagram of a plate material provided according to a sixth embodiment of the present disclosure.

Please refer to FIG. 11, which is a partial three-dimensional structural diagram of the carbon steel sheet material. The material of the carbon steel sheet material is a steel profile. The steel profile is a carbon steel, and a hardness of the steel profile varies with a carbon content.

The carbon steel sheet material includes a plurality of portions to be bent 80. In the process of forming the photovoltaic frame, the carbon steel sheet material is bent along the portions to be bent 80. The number of the portions to be bent 80 in the carbon steel sheet material may be set according to a specific structure of the photovoltaic frame, and a distance between adjacent portions to be bent 80 may be set according to a length of each edge of the photovoltaic frame.

Figure 12:
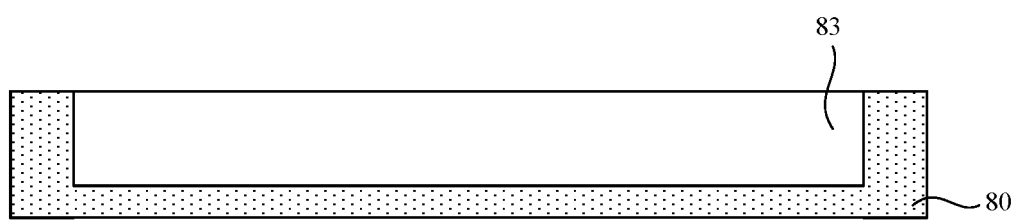
FIG. 12 is a first sectional view of a portion to be bent in FIG. 11 along a first direction.

Referring to FIG. 11 and FIG. 12, FIG. 12 is a first sectional view of the portion to be bent 80 in FIG. 11 along the first direction. In one example, the portion to be bent 80 has a groove 83 extending from one end to the other end of the carbon steel sheet material in the first direction. That is, one portion to be bent 80 corresponds to one groove 83, and the groove 83 crosses the carbon steel sheet material, that is, a length of the top opening of the groove 83 is the same as a width of the carbon steel sheet material along the first direction.

The groove 83 occupies a large space in the portion to be bent 80, so that the carbon steel sheet material is easier to be bent into shape. For the carbon steel sheet material of a hard material such as the steel profile, it is suitable to adopt the groove 83 across both ends of the carbon steel sheet material.

A bottom of the groove 83 is located in the portion to be bent 80, and a ratio of a depth c of the groove 83 to a thickness f of the carbon steel sheet material between the adjacent portions to be bent 80 is in a range of 0.2-0.6, such as 0.3 or 0.5. When the ratio is within the range, it may not only ensure that the portion to be bent 80 has a certain strength, avoid a fracture of the carbon steel sheet material, but also ensure that the portion to be bent 80 is easy to bend.

In addition, it can be understood that a single groove 83 across the carbon steel sheet material shall not penetrate through the top surface 81 and the bottom surface 82 of the carbon steel sheet material; otherwise the carbon steel sheet material is no longer integrally formed.

A thickness e of the portion to be bent 80 directly opposite to the groove 83 is in a range of 1.2-4 mm. If the thickness e is too large, it will easily lead to a problem of inability to bend; and if the thickness e is too small, it will easily lead to a problem of breakage. The portion to be bent 80 within the above thickness range has both good strength and toughness, which may avoid the above two problems.

Figure 13:
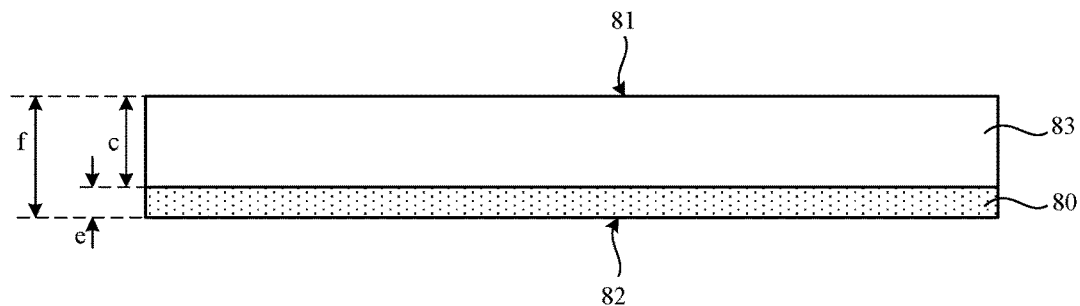
FIG. 13 is a second sectional view of the portion to be bent in FIG. 11 along the first direction.

Referring to FIG. 13, FIG. 13 is a second sectional view of the portion to be bent 80 in FIG. 11 along the first direction. In another example, the portion to be bent 80 has a groove 83, but the groove 83 does not cross the carbon steel sheet material, that is, there is no opening at both ends of the carbon steel sheet material along the first direction. In this way, the fracture of the carbon steel sheet material caused by an excessive bending angle or an excessive bending force may be avoided.

With reference to FIGS. 11 and 14 to 16, FIGS. 14 to 16 are four different sectional views of the upper portion to be bent 80 in FIG. 11 along the first direction. Specifically, the portion to be bent 80 has at least two grooves 83 arranged at intervals, and an arrangement direction of the grooves 83 arranged at intervals is the same as the first direction. Since a plurality of the grooves 83 are arranged adjacent to each other, the carbon steel sheet material between the adjacent grooves 83 still has enough thickness, which may ensure that the portion to be bent 80 has a high strength and prevent the portion to be bent 80 from breaking.

In addition, in the first direction, a length b of the top opening of the groove 83 is smaller than a distance a between the adjacent grooves 83. Since the carbon steel sheet material between the adjacent grooves 83 has high strength, when the distance a between the adjacent grooves 83 is large, the portion to be bent 80 may be ensured to have high strength. Specifically, when a width of the carbon steel sheet material along the first direction is within a range of 20 mm-400 mm, one groove 83 and the carbon steel sheet material between the grooves 83 serve as one group of a unit structure. There are N groups of the unit structures for one portion to be bent 80, and (a+b)*N is the same as the width of the carbon steel sheet material along the first direction, where a/b is less than 100% and n is 2-20. For example, N may be 2.5 (that is, having two groups of the unit structures and one groove 83 in a group of the unit structure or the carbon steel sheet material between the grooves 83), 5, 10, etc.

Figure 14:
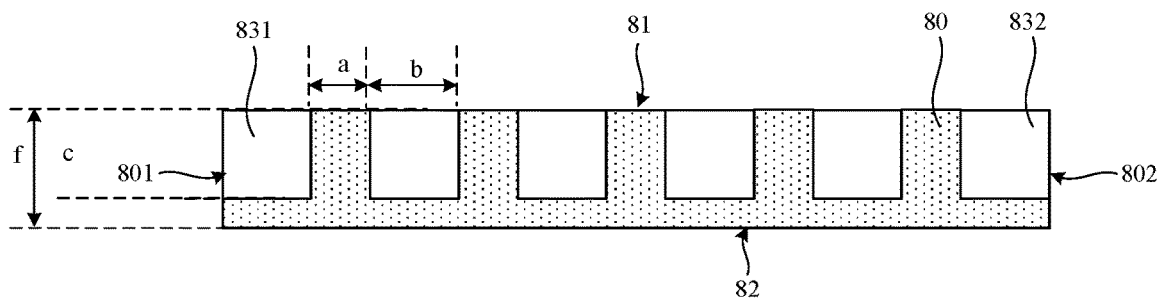
FIG. 14 is a third sectional view of the portion to be bent in FIG. 11 along the first direction.

The technical solution for the portion to be bent 80 having at least two grooves 83 arranged at intervals includes the following specific examples:

In Example one, referring to FIGS. 11 and 14, the carbon steel sheet material further includes a first side surface 801 and a second side surface 802 both for connecting the top surface 81 and the bottom surface 82, and the first side surface 801 is opposite to the second side surface 802. The groove 83 at least includes: a first groove 831, which penetrates through the first side surface 801; a second groove 832, which penetrates through the second side surface 802. In this way, when the portion to be bent 80 is bent, both ends of the portion to be bent 80 may maintain a good flatness and improve the aesthetics.

In addition, the bottom of the groove 83 is located in the portion to be bent 80, and the ratio of the depth c of the groove 83 to the thickness f of the carbon steel sheet material between the adjacent portions to be bent 80 is in a range of 0.5-1. Compared with the groove 83 across the carbon steel sheet material, the ratio of the depth c of the grooves 83 arranged at intervals to the thickness f of the carbon steel sheet material between the adjacent portions to be bent 80 is larger. The main reason for this design is that the carbon steel sheet material between the grooves 83 arranged at intervals has high strength and is not easy to bend. If the ratio of the depth of the groove 83 to the thickness f of the carbon steel sheet material between the adjacent portions to be bent 80 is less than 0.5, the whole portion to be bent 80 is difficult to be bent. Therefore, the groove 83 is correspondingly deepened, then the thickness of the portion to be bent 80 corresponding to the groove 83 becomes smaller, which may make the whole portion to be bent 80 be bent more easily.

Figure 15:
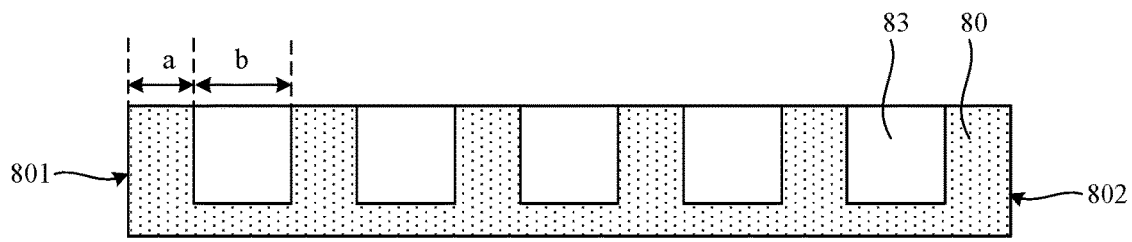
FIG. 15 is a fourth sectional view of the portion to be bent in FIG. 11 along the first direction.

In Example two, referring to FIGS. 11 and 15, the groove 83 does not penetrate through the first side surface 801 and the second side surface 802.

Figure 16:
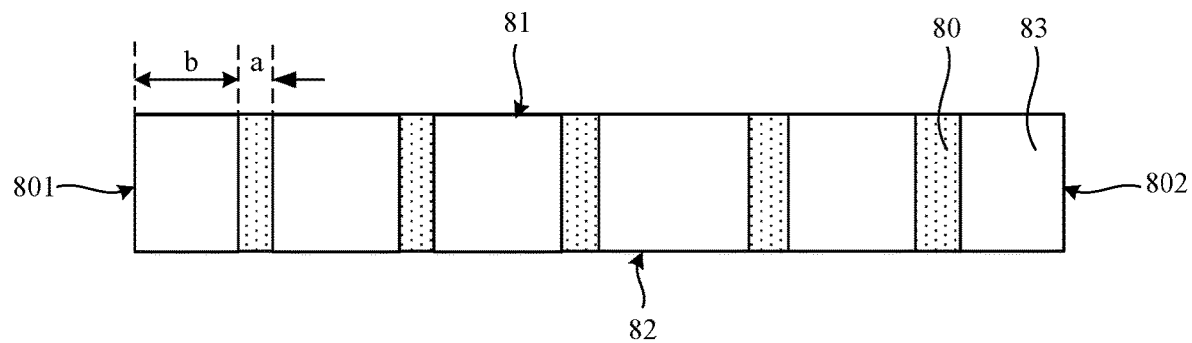
FIG. 16 is a fifth sectional view of the portion to be bent in FIG. 11 along the first direction.

In Example three, referring to FIGS. 11 and 16, the groove 83 penetrates through the top surface 81 and the bottom surface 82 of the portion to be bent 80. Since the ratio between the depth of the groove 83 and the thickness of the carbon steel sheet material does not need to be considered, the process difficulty is reduced.

Figure 17:
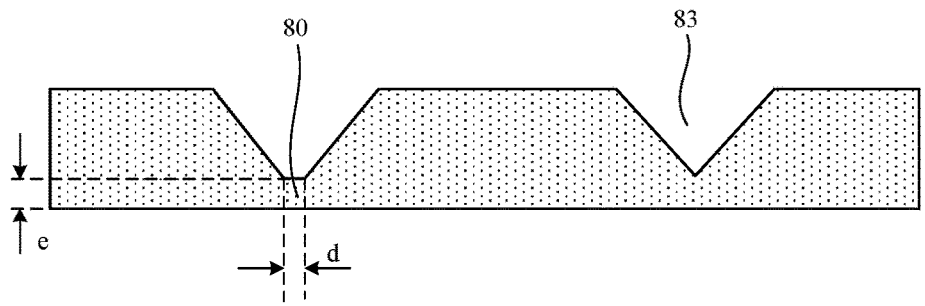
FIG. 17 is a sectional view of the portion to be bent in FIG. 11 along a direction perpendicular to the first direction.

Referring to FIGS. 11 and 17, FIG. 17 is a sectional structural diagram of the portion to be bent 80 in FIG. 11 along a direction perpendicular to the first direction. On a cross section perpendicular to the first direction, a cross section shape of the groove 83 includes an inverted triangle or an inverted trapezoid, and the top opening of the groove 83 is larger than a bottom opening of the groove 83.

For the inverted trapezoidal groove 83, that is, a certain width d is reserved at the bottom of the groove 83, designing a certain width is easy to maintain an original deformation of the carbon steel sheet material, so that the carbon steel sheet material has a certain space for combination during the bending process, which is conducive to fixation and bending.

The width d of the bottom opening of the groove 83 is in a range of 4-10 mm, and the opening in this width range is closest to the deformation of the carbon steel sheet material when bending. If the reserved width d is greater than 10mm, an excessive gap may be left between the opposite side walls of the groove 83 after the portion to be bent 80 is bent.

On the cross section perpendicular to the first direction, an included angle between the opposite side walls of the groove 83 is in a range of 20 degrees to 160 degrees. By designing this angle range, photovoltaic frames with different shapes may be manufactured, such as parallelogram, triangle, diamond and other irregular shapes. The photovoltaic frames with various shapes may be applied to different application scenarios. For example, the photovoltaic frames in the shape of parallelogram, triangle or diamond may be applied to building integrated photovoltaic (BIPV). For example, when the included angle between the opposite side walls of the groove 83 is 90 degree, after the portion to be bent 80 is bent, the opposite side walls of the groove 83 are attached to each other to form an included angle of 90 degree. When the included angle between the opposite side walls of the groove 83 is 60 degree, after the portion to be bent 80 is bent, the opposite side walls of the groove 83 are attached to each other to form an included angle of 120 degree.

On the cross section perpendicular to the first direction, a difference in the lengths of the opposite side edges of the groove 83 is in a range of 0-15 mm. That is, the lengths of the opposite side edges may be different. For example, a length of one side edge is within a cavity of the long side edge and a length of the other side edge is within a cavity of the short side edge. Since the carbon steel sheet material should be fixed in a certain way after bending and molding, such as welding or riveting, if the length difference between the opposite side edges exceeds a threshold, a firmness of the finally formed photovoltaic frame may be affected, which is not conducive to the fixing and installation of the four edges and is easy to fall apart. The length difference between the opposite side edges being within a threshold range of 15 mm may ensure the stability of the finally formed photovoltaic frame.

Preferably, the lengths of the opposite side edges of the groove 83 are equal. In this way, it is beneficial to improve the aesthetics of the finally formed photovoltaic frame; and may maintain a uniform stress during installation, packaging and transportation to avoid deformation.

To sum up, the carbon steel sheet material provided in this embodiment has the plurality of portions to be bent 80 and the groove 83 on the portion to be bent 80. In this way, by bending the portion to be bent 80, an integrated photovoltaic frame may be formed. In addition, the number and type of the grooves 83 may be changed according to the size and shape of the photovoltaic frame. In this way, an automation degree of the photovoltaic frame production may be improved, and the production efficiency may be improved.

A seventh embodiment of the present disclosure provides a photovoltaic frame, and the photovoltaic frame of this embodiment may be made of the carbon steel sheet material of the sixth embodiment. FIGS. 18-25 are schematic structural diagrams of the photovoltaic frame. The photovoltaic frame includes: a plurality of connection portions 30 connected in sequence, where the connection portions 30 are used for forming a top support portion 1, a bottom support portion 2, a first side edge portion 3, a second side edge portion 4 and a transverse edge portion 5; the top support portion 1, the second side edge portion 4 and the transverse edge portion 5 enclose a holding slot, and the top support portion 1 has a bearing surface facing the holding slot; the bottom support portion 2 is arranged opposite to the top support portion 1; the first side edge portion 3, the top support portion 1 and the bottom support portion 2 enclose a closed cavity 20, and the first side edge portion 3 and the second side edge portion 4 are respectively located on opposite sides of the top support portion 1; a bending portion 9 which connects two adjacent connection portions 30 and includes two abutting side surfaces 90; the plurality of the connection portions 30 connected in sequence and the bending portion 9 being integrally formed.

The following will be described in detail with reference to the accompanying drawings.

Figure 21:
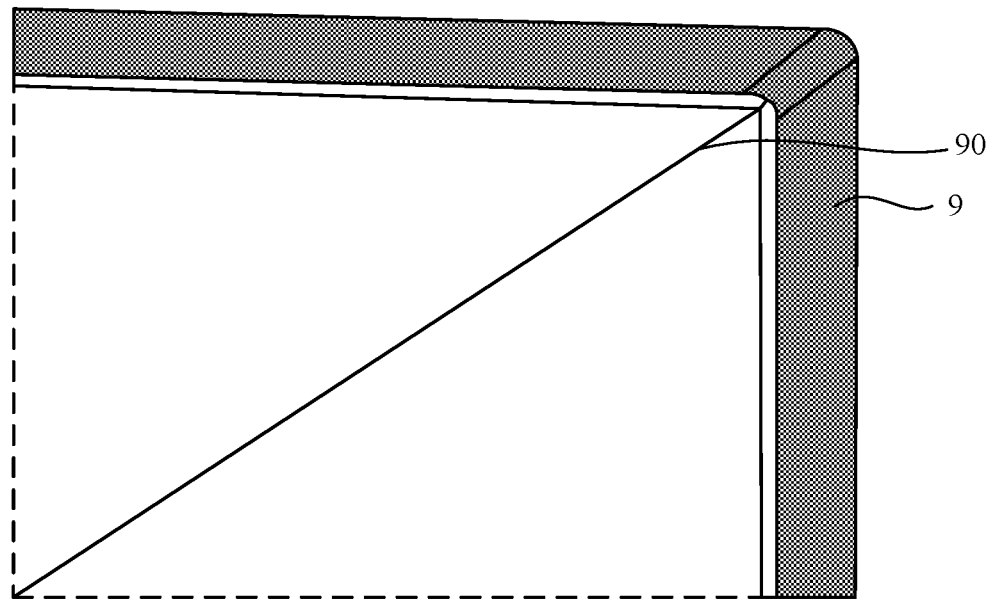
FIG. 21 is a first enlarged view of a bending portion of the photovoltaic frame provided by the seventh embodiment.
Figure 22:
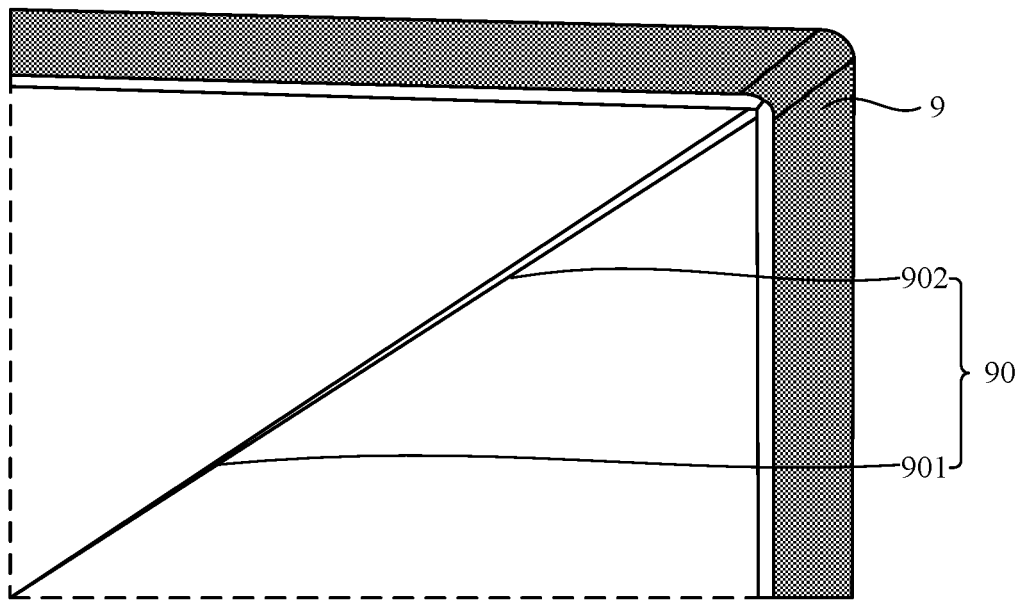
FIG. 22 is a second enlarged view of the bending portion of the photovoltaic frame provided by the seventh embodiment.

FIGS. 21 and 22 are enlarged views of the bending portion of the photovoltaic frame. Referring to FIG. 21, the two abutting side surfaces 90 of the bending portion 9 are attached to each other. At this time, a contact area between the two side surfaces 90 is large, and a firmness of the bending portion 9 is good.

Referring to FIG. 22, the two abutting side surfaces 90 of the bending portion 9 include: two contact surfaces 901 which are attached to each other; a connection surface 902 connected with each of the contact surfaces 901, with a gap between the two opposite connection surfaces 902. Accordingly, an adhesive may be filled in the gap to improve the firmness of the bending portion 9.

For irregular photovoltaic frames, the included angles between the connection portions 30 are different. If different portions to be bent 80 are manufactured for different included angles (refer to FIG. 11), the process is more complicated and the cost is high. Therefore, the same type of the portions to be bent 80 may be manufactured. After the irregular photovoltaic frame is formed, two side surfaces 90 of some of the bending portions 9 have gaps, and two side surfaces 90 of some of the bending portions 9 are attached to each other. The some of the bending portions 9 having the gaps are filled with the adhesive. In this way, not only the process may be simplified and the cost may be saved, but also the firmness of the photovoltaic frame may be improved.

Figure 18:
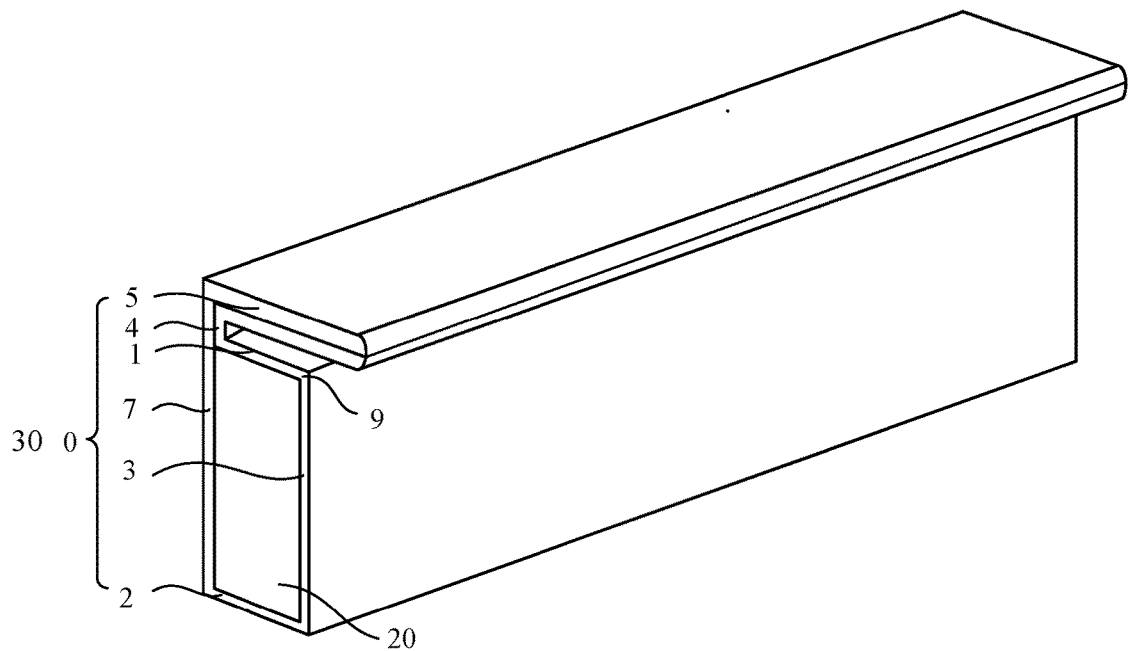
FIG. 18 is a structural schematic diagram of a first photovoltaic frame provided by a seventh embodiment.
Figure 19:
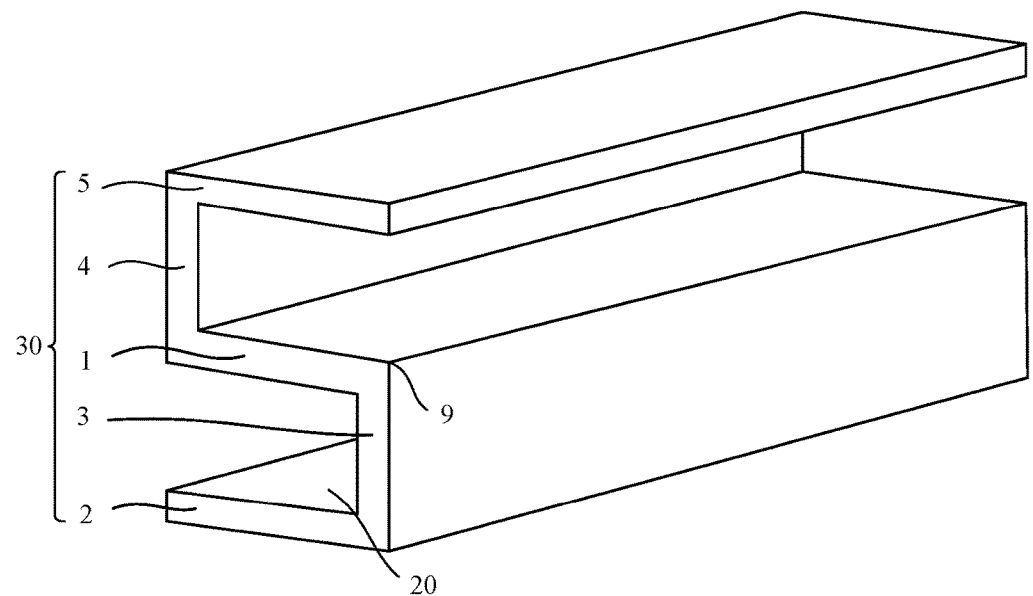
FIG. 19 is a schematic structural diagram of a second photovoltaic frame provided by the seventh embodiment.
Figure 20:
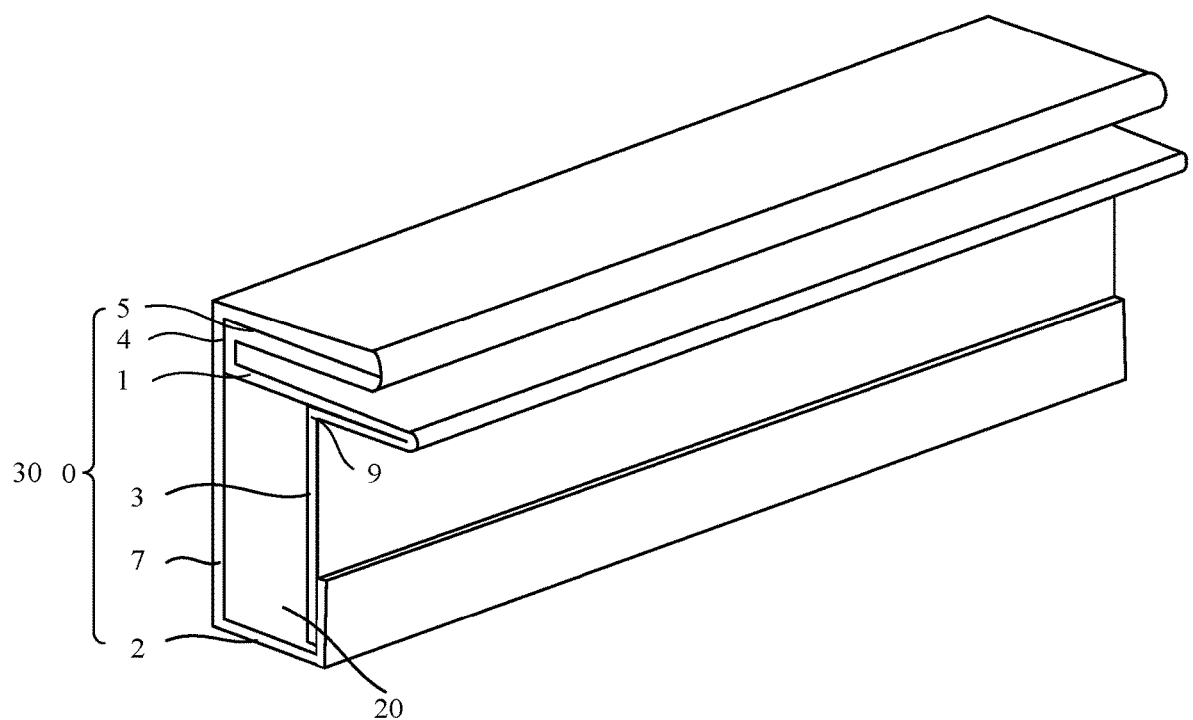
FIG. 20 is a schematic structural diagram of a third photovoltaic frame provided by the seventh embodiment.

FIGS. 18 to 20 are schematic diagrams of three kinds of three-dimensional structures of the photovoltaic frame. Referring to FIGS. 18 to 20, the top support portion 1, the second side edge portion 4 and the transverse edge portion 5 enclose the holding slot for placing a photovoltaic panel, and the bearing surface of the top support portion 1 supports the photovoltaic panel.

Referring to FIG. 18, the first side edge portion 3, the top support portion 1 and the bottom support portion 2 enclose the closed cavity 20, and the closed cavity 20 is an open cavity. The bending portion 9 is arranged between any two adjacent connection portions 30. The photovoltaic frame with the open cavity has a simple structure and low cost.

Each of the connection portions 30 is a single-layer sheet material structure, which may simplify the process, save materials and reduce the cost.

Referring to FIGS. 19 and 20, the connection portion 30 further includes: a third side edge portion 7, which connects the top support portion 1 and the bottom support portion 2 to enclose an enclosed closed cavity 20, and the bending portion 9 is also arranged between the third side edge portion 7 and the top support portion 1 and/or between the first side edge portion 3 and the bottom support portion 2.

The enclosed closed cavity 20 may protect a filling inside the enclosed closed cavity 20 to enhance the strength of the photovoltaic frame. In addition, the third side edge portion 7 also has a supporting function, and the photovoltaic frame is not easily deformed.

Further, referring to FIG. 19, the top support portion 1 is a single layer structure. Therefore, consumables are fewer and the structure is simple.

Referring to FIG. 20, the top support portion 1 is divided into a first part and a second part. The first part corresponds to the closed cavity 20, and the first part is a single-layer sheet material structure. The second part is outside the closed cavity 20, and the second part is a double-layer sheet material structure. Therefore, a contact area between the top support portion 1 and the photovoltaic panel is larger and the stability is better.

An included angle between any two adjacent ones of the bottom support portion 2, the top support portion 1, the first side edge portion 3 and the third side edge portion 7 is in a range of 20-160 degrees. In this way, the photovoltaic frame may have various shapes, such as parallelogram, triangle, diamond and other irregular shapes. The photovoltaic frame with various shapes may be applied to buildings, which may increase the aesthetics.

At least two adjacent connection portions 30 have an overlapping part, and the overlapping part is a double-layer sheet material structure. Since the photovoltaic frame is integrally formed, for the photovoltaic frame with a complex configuration, the overlapping method may be used to avoid cutting the sheet material into two pieces, thus reducing the process steps. In addition, the double-layer sheet material structure may also enhance the strength of photovoltaic frame.

One of the top support portion 1, the bottom support portion 2, the first side edge portion 3, the second side edge portion 4, or the transverse edge portion 5 is formed by abutting two connection portions 30 at the head and tail. That is, an enclosed area of the photovoltaic frame is formed by abutting the two connection portions 30. In this way, a firmness of the enclosed area may be ensured, and the deformation of the photovoltaic frame may be avoided.

Since the first side edge portion 3, the third side edge portion 7 and the bottom support portion 2 support the whole photovoltaic frame, the photovoltaic frame is not easily deformed by selecting the connection portion 30 with a weak bearing function such as the top support portion 1, the second side edge portion 4 or the transverse edge portion 5 as the enclosed area.

Figure 23:
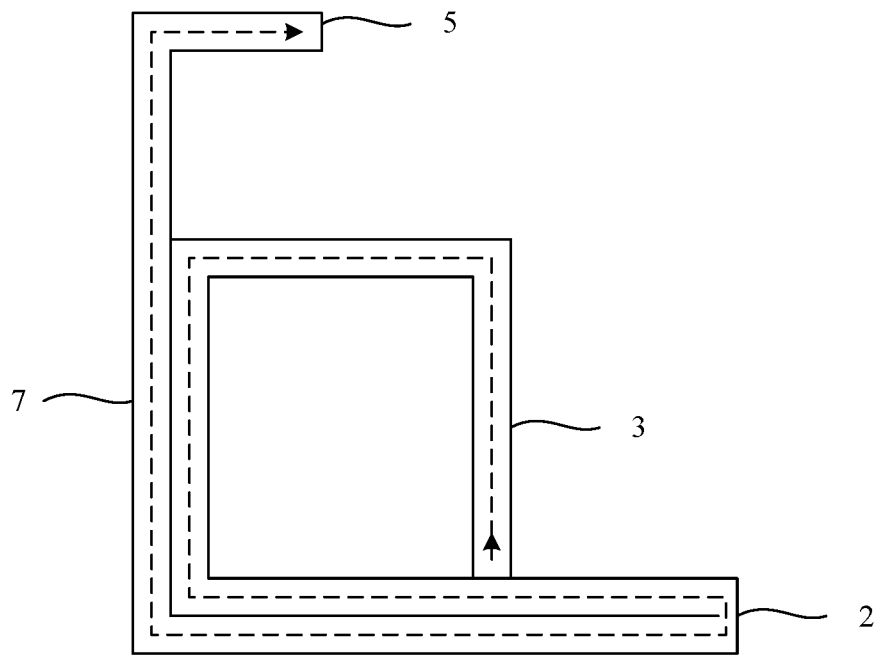
FIG. 23 is a first side view of the photovoltaic frame provided by the seventh embodiment.

The technical solutions for a bending mode of the photovoltaic frame include the following specific examples:

For Example one, referring to FIG. 23, FIG. 23 is a first side view of the photovoltaic frame. A start point of bending is on the first side edge portion 3, and an ending point is on the transverse edge portion 5; or, the start point of the bending is on the transverse edge portion 5 and the ending point is on the first side edge portion 3.

The connection portion 30 (refer to FIGS. 18-20) corresponding to two dotted lines is the double-layer sheet material structure, and the connection portion 30 corresponding to one dotted line is the single-layer sheet material structure.

In Example one, the third side edge portion 7 and the bottom support portion 2 are the double-layer sheet material structure, and the photovoltaic frame has high strength. In addition, the whole photovoltaic frame is integrally formed by a sheet material, so that the manufacturing time may be shortened and the process difficulty may be reduced.

Figure 24:
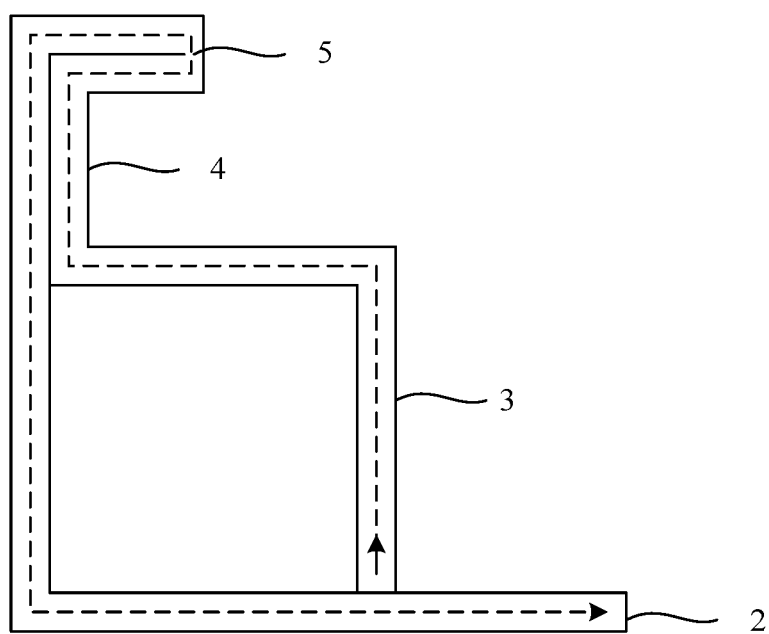
FIG. 24 is a second side view of the photovoltaic frame provided by the seventh embodiment.

For Example two, referring to FIG. 24, FIG. 24 is a second side view of the photovoltaic frame. The configuration of the photovoltaic frame in FIG. 24 is the same as the configuration of the photovoltaic frame in FIG. 23, except that a folding order and the number of layers of the connection portion 30 (refer to FIGS. 18-20) are different.

Specifically, in Example two, the start point of bending is on the first side edge portion 3, and the end point is on the bottom support portion 2; or the start point of bending is on the bottom support portion 2 and the end point is on the first side edge portion 3.

Correspondingly, the second side edge portion 4 and the transverse edge portion 5 are the double-layer sheet material structure. Since the lengths of the second side edge portion 4 and the transverse edge portion 5 are short, even if the second side edge portion 4 and the transverse edge portion 5 are the double-layer sheet material structure, the photovoltaic frame consumes less sheet material.

Figure 25:
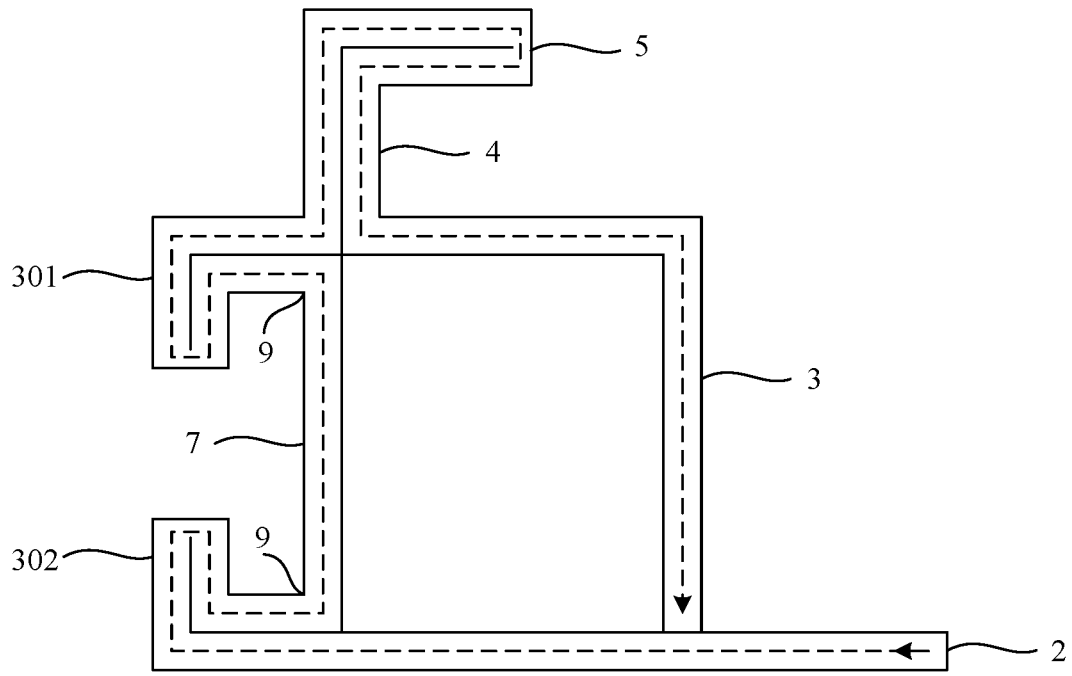
FIG. 25 is a third side view of the photovoltaic frame provided by the seventh embodiment.

For Example three, referring to FIG. 25, FIG. 25 is the third side view of the photovoltaic frame. The connection portion 30 further includes a first connection portion 301 and a second connection portion 302 respectively connected with the third side edge portion 7; and the first connection portion 301, the third side edge portion 7 and the second connection portion 302 enclose a pressing block area, and the bending portion 9 is also arranged between the first connection portion 301 and the third side edge portion 7 and/or between the second connection portion 302 and the third side edge portion 7. The pressing block area may be used for fixing the photovoltaic frame to prevent the photovoltaic frame from collapsing.

The first connection portion 301 and the second connection portion 302 have a double-layer sheet material structure. Since the first connection portion 301 and the second connection portion 302 have a function of fixing the photovoltaic frame, the first connection portion 301 and the second connection portion 302 adopt the double-layer sheet material structure to be firmer and prevent the photovoltaic frame from collapsing.

The start point of the bending is located at the bottom support portion 2, and the end point of the bending is located at the first side edge portion 3; or the start point of the bending is located at the first side edge portion 3, and the end point of the bending is located at the bottom support portion 2. In addition, the transverse edge portion 5 and the second side edge portion 4 also have a double-layer sheet material structure.

It should be noted that the specific structure of the photovoltaic frame provided in this embodiment is not limited to the several examples provided above, and that the photovoltaic frame formed by bending the sheet material body along the portion to be bent is within the scope of this embodiment.

The photovoltaic frame further includes a reinforcing member (not shown), and the reinforcing member penetrates through the two abutting side surfaces of the bending portion 9. The reinforcing member includes a welding reinforcing member, a riveting reinforcing member or a mortise and tenon reinforcing member. The reinforcing member may strengthen the firmness of the bending portion 9 and avoid the deformation of the photovoltaic frame.

To sum up, the photovoltaic frame provided in this embodiment has the connection portions 30 connected in sequence and the bending portions 9 connecting the adjacent connection portions 30, and the connection portions 30 and the bending portions 9 are integrally formed, so that the production efficiency of the photovoltaic frame may be improved and the production cost may be reduced. In addition, the overall strength and firmness of the photovoltaic frame may be improved by arranging some of the connection portions 30 with the double-layer structure, reinforcing the bending portion 9 and filling the closed cavity 20.

Figure 26:
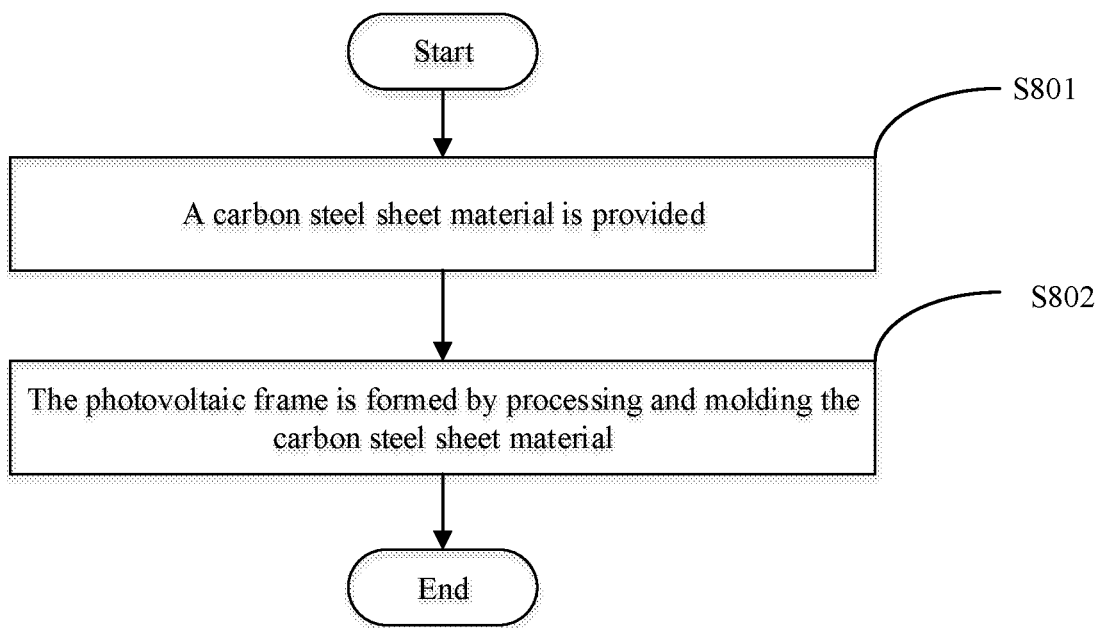
FIG. 26 is a flowchart of a method for manufacturing a photovoltaic frame provided by an eighth embodiment.

An eighth embodiment of the present disclosure provides a method for manufacturing a photovoltaic frame, and the specific process as shown in FIG. 26 includes:

In S801, a carbon steel sheet material is provided.

Specifically, a carbon content in the carbon steel sheet material in this embodiment is in a range of 0.04% to 0.25%. Since too low carbon content in the carbon steel sheet material may lead to a weak strength of the carbon steel sheet material, which is difficult to meet the structural strength requirements of the photovoltaic frame. The excessive carbon content in the carbon steel sheet material may lead to an increase in a salt spray corrosion rate of the carbon steel sheet material, which is difficult to meet the requirement of a warranty period of the photovoltaic frame. By using the carbon steel sheet material with this carbon content range to manufacture the photovoltaic frame, the strength of the photovoltaic frame may meet the design requirements without affecting the warranty period of the photovoltaic frame.

The strength of the carbon steel sheet material is in a range of 200 MPa to 600 MPa. The strength of the carbon steel sheet material represents a mechanical property of the carbon steel sheet material against fracture and excessive deformation. By adopting the carbon steel sheet material with such strength range, the manufactured photovoltaic frame may meet the design requirements and is not easy to deform under an action of an external force, which improves the stability of the photovoltaic frame.

A percentage of breaking elongation of the carbon steel sheet material is within a range of 15% to 36%. When the carbon steel sheet material is subjected to the external force to break, a ratio of an elongation length after stretching to a length before stretching is the percentage of breaking elongation of the carbon steel sheet material. By adopting the carbon steel sheet material with such percentage of breaking elongation range, the manufactured photovoltaic frame may meet the design requirements, has a certain deformation capability, and does not break after a slight deformation, which improves the stability of the photovoltaic frame.

In S802, the photovoltaic frame is formed by processing and molding the carbon steel sheet material.

Specifically, the photovoltaic frame includes: a top support portion, a bottom support portion, a first side edge portion, a second side edge portion and a transverse edge portion, where the top support portion, the second side edge portion, and the transverse edge portion enclose a holding slot, and the top support portion has a bearing surface facing the holding slot, the bottom support portion is arranged opposite to the top support portion, and the transverse edge portion is located one side of the top support portion away from the bottom support portion; the first side edge portion connects the top support portion and the bottom support portion.

It can be understood that the photovoltaic frame in this embodiment is not limited to the above-mentioned structure, but may also include other structures, which have been described in detail in the foregoing embodiments, and are not be described here to avoid repetition.

It is worth mentioning that, in this embodiment, the carbon steel sheet material is molded after processing. Specifically, a calendaring and cold roll forming process is adopted for the carbon steel sheet material to form the photovoltaic frame. In this way, the method for manufacturing the photovoltaic frame is simple, the cost is low, and there is no pollution in the manufacturing process.

More preferably, the carbon steel sheet material of this embodiment includes a plurality of portions to be bent. The carbon steel sheet material includes a top surface and a bottom surface which are oppositely arranged. The portions to be bent have at least one groove recessed from the top surface toward the bottom surface. An extending direction of each of the portions to be bent is a first direction, and an extending direction of a top opening of the groove is the same as the first direction. The processing includes: bending the portion to be bent to form the photovoltaic frame. Through an arrangement of this structure, the carbon steel sheet material is easier to bend, thus reducing the difficulty of manufacturing the photovoltaic frame.

Figure 27:
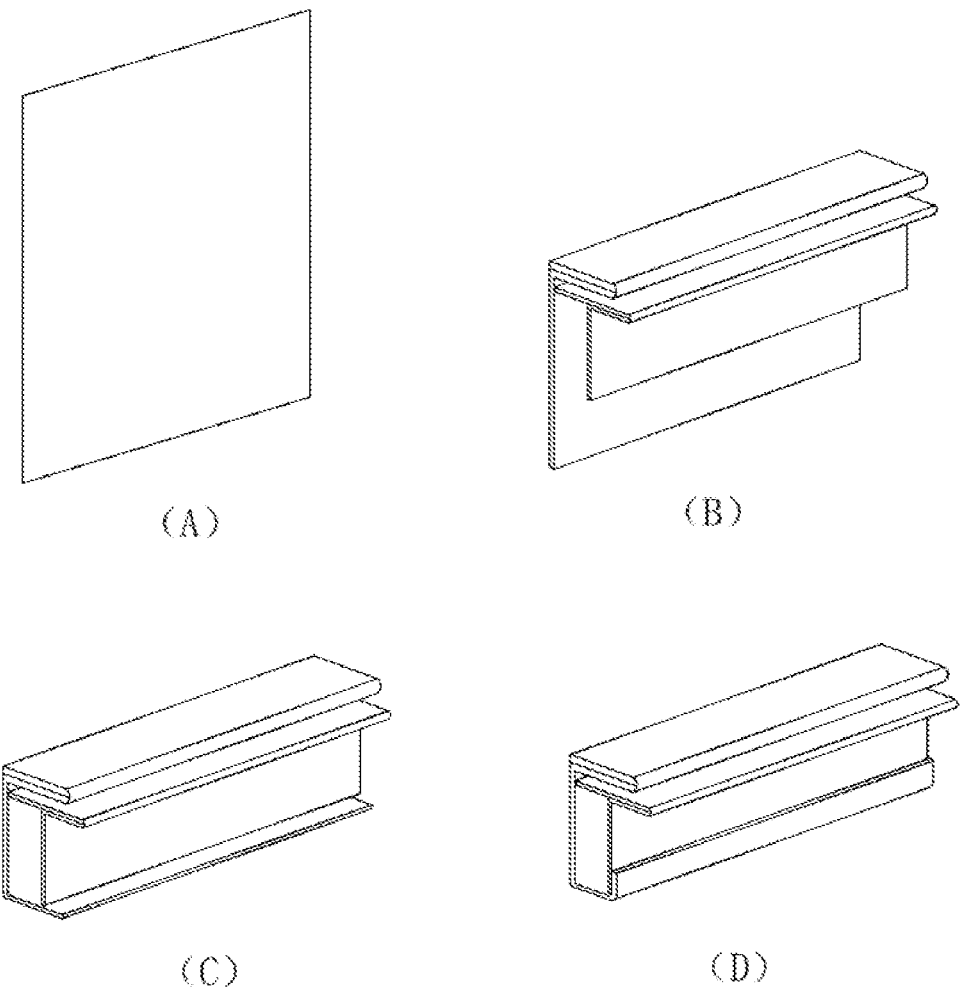
FIG. 27 is a schematic structural diagram corresponding to each step of the method for manufacturing the photovoltaic frame provided by the eighth embodiment.

FIG. 27 is a schematic structural diagram corresponding to each step of the manufacturing method.

Referring to FIG. 27(A), the sheet material of the first embodiment is provided.

The method for manufacturing the sheet material includes: designing the number of the portions to be bent required by a sheet material body and a distance between adjacent portions to be bent according to a required layout of the photovoltaic frame. Further, the shape and number of grooves on the portion to be bent are designed. The sheet material body is cut by laser to form the portion to be bent and the groove on the portion to be bent. After forming the portion to be bent, the sheet material is cut off according to a required assembly size. In this way, the sheet material in the first embodiment may be manufactured. The remaining sheet material body may still form another photovoltaic frame in succession.

Referring to FIGS. 27(B)-(D), a plurality of connection portions and bending portions connected in sequence are formed by bending along the portions to be bent on the sheet material. The bending portion connects two adjacent connection portions, and the bending portion includes two abutting side surfaces. The plurality of the connection portions and bending portions connected in sequence are integrally formed.

The bending mode may be a stamping. In addition, before the bending, the portion to be bent may also be heated to improve a toughness of the portion to be bent.

After the bending, the bending portion is reinforced, such as by welding (resistance welding and argon arc welding may be selected), riveting, mortise and tenon, and other connection assembly scheme, so as to avoid the photovoltaic frame loosing.

In addition, a cavity may also be filled with an organic material such as a polyurethane foam and extruded to enhance the strength of the sheet material. It is worth noting that a polyurethane foaming temperature should be met in this step. When the temperature is low, an ambient temperature may be raised by means of illumination, hot plate heating, etc., so that the polyurethane meets the foaming requirements.

To sum up, the method for manufacturing the photovoltaic frame provided in this embodiment adopts an integrated cutting method, and the cut sheet material is bent to form the photovoltaic frame. Therefore, it is beneficial to improve productivity efficiency and realize a full automation of photovoltaic frame production.

Correspondingly, an embodiment of the present disclosure further provides a photovoltaic module, which includes a stacked structure and the photovoltaic frame provided in any of the above embodiments, where the stacked structure includes a panel, a first adhesive film, a cell piece, a second adhesive film and a backplane which are sequentially stacked. A bearing surface of the photovoltaic frame bears the stacked structure.

Figure 28:
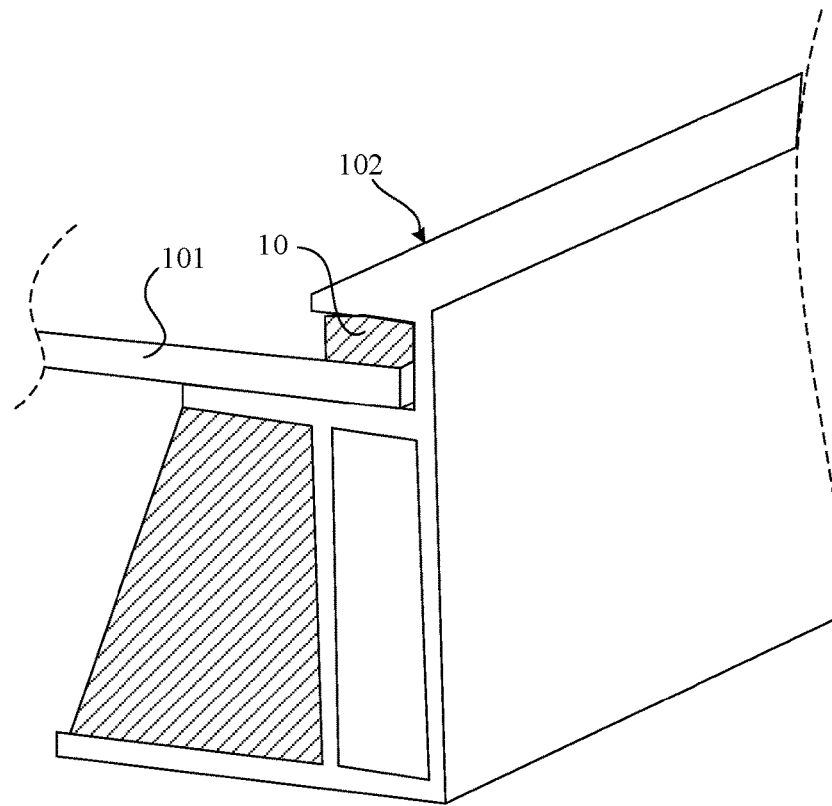
FIG. 28 is a schematic diagram of a partial three-dimensional structure of a photovoltaic module provided by an embodiment of the present disclosure.

FIG. 28 is a schematic diagram of a partial three-dimensional structure of the photovoltaic module. The photovoltaic module includes a photovoltaic frame 102 and a stacked structure 101. A holding slot 10 of the photovoltaic frame 102 holds the stacked structure 101, so that the stacked structure 101 is stably fixed with the photovoltaic frame 102, thereby improving the stability of the photovoltaic module.

The photovoltaic module may further include a filling portion 10 for filling a gap area between the stacked structure 101 and the holding slot 10. In addition, the filling portion 10 may also fill other areas of the photovoltaic frame, which may further improve the stability of the photovoltaic frame.

Figure 29:
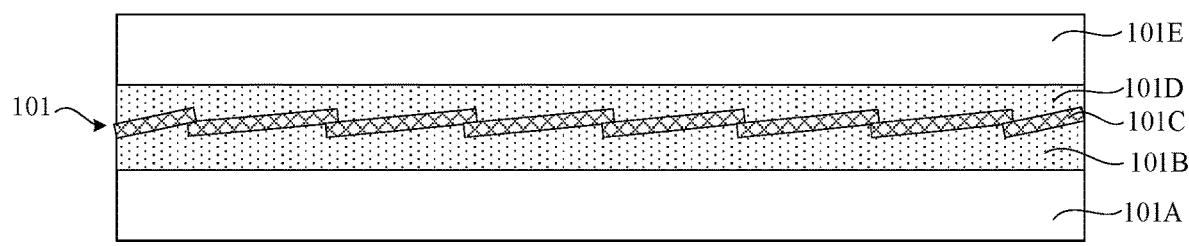
FIG. 29 is a sectional structural diagram of a stacked structure in FIG. 28.

FIG. 29 is a sectional structural diagram of the stacked structure in FIG. 28. The stacked structure 101 includes a panel 101A, a first adhesive film 101B, a cell piece 101C, a second adhesive film 101D and a backplane 101E which are stacked in sequence, where the panel 101A is located on a light receiving surface of the cell piece 101C, and adjacent cell pieces 101 are overlapped. The backplane 101E may be a glass or an organic backplane.

Figure 30:
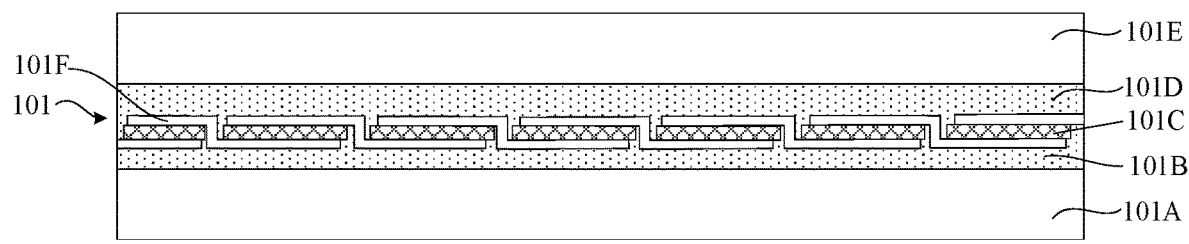
FIG. 30 is another sectional structural diagram of the stacked structure in FIG. 28.

FIG. 30 is another sectional structural diagram of the stacked structure in FIG. 28. The adjacent cell pieces 101C are not overlapped and an electrical connection may be realized by a ribbon 101F.

In one example, the stacked structure 101 may be a single glass assembly, that is, the panel 101A is the glass, and the backplane 101E may be an organic backplane or a non-transparent backplane.

In another example, the stacked structure 101 may also be a double glass assembly, that is, both the panel 101A and the back panel 101E are the glass.

In yet another example, the panel 101A includes a long side edge and a short side edge adjacent to each other, where a length of the long side edge is greater than or equal to 2 m, and a length of the short side edge is greater than or equal to 1 m. The stacked structure 101 may be defined as a large-size assembly.

Since the transparent backplane assembly and the large-size assembly have a limited structural strength and are easy to be damaged under an external force, the photovoltaic frame provided in the foregoing embodiments is combined with the stacked structure 101 to form the photovoltaic assembly, so that when the photovoltaic assembly has the backplane or panel with a poor structural strength, the photovoltaic frame may play a good supporting role, avoiding the backplane or the panel being damaged under the external force, thereby improving the reliability of the photovoltaic assembly.

Those skilled in the art should appreciate that the aforementioned embodiments are specific embodiments for implementing the present disclosure. In practice, however, various changes may be made in the forms and details of the specific embodiments without departing from the spirit and scope of the present disclosure.

What is claimed is:

1. A photovoltaic frame, comprising:
   a top support portion,
   a bottom support portion, arranged opposite to the top support portion;
   a first side edge portion, configured to connect the top support portion and the bottom support portion;
   a transverse edge portion, located at one side of the top support portion away from the bottom support portion;
   a second side edge portion, configured to connect the top support portion and the transverse edge portion;
   wherein:
      the top support portion, the second side edge portion and the transverse edge portion form a holding slot configured to hold a stacked structure; the top support portion has a bearing surface facing the holding slot;
      the second side edge portion has a first inner surface and a first outer surface which are opposite to each other, and the first inner surface being a part of an inner wall of the holding slot;
      the transverse edge portion has a second inner surface and a second outer surface that are opposite to each other, and the second inner surface facing the top support portion;

the top support portion has a third inner surface and a third outer surface that are opposite to each other, and the third inner surface facing the transverse edge portion;
the bottom support portion has an upper surface and a lower surface that are opposite to each other; and
the first side edge portion has a left surface and a right surface that are opposite to each other;
a first weather-resistant protective layer, configured to cover at least one of the first inner surface, the first outer surface, the second inner surface, the second outer surface, the third inner surface, the third outer surface, the upper surface, the lower surface, and the left and right surfaces of the first side edge portion; and
a second weather-resistant protective layer, configured to cover at least one of surfaces that are not covered by the first weather-resistant protective layer in the first inner surface, the first outer surface, the second inner surface, the second outer surface, the third inner surface, the third outer surface, the upper surface, the lower surface, and the left and right surfaces of the first side edge portion;
wherein a thickness of the second weather-resistant protective layer is less than a thickness of the first weather-resistant protective layer.

2. The photovoltaic frame according to claim 1, further comprising a third side edge portion, configured to connect the top support portion and the bottom support portion;
the third side edge portion having a left surface and a right surface which are opposite to each other, the right surface of the third side edge portion facing the first side edge portion; and
wherein the first weather-resistant protective layer is further configured to cover one of the left and right surfaces of the third side edge portion, and the second weather-resistant protective layer is further configured to cover a surface that is not covered by the first weather-resistant protective layer in the left and right surfaces of the third side edge portion.

3. The photovoltaic frame according to claim 2, wherein the inner wall of the holding slot includes the first inner surface, the second inner surface and the third inner surface, and the inner wall is not covered with the first and second weather-resistant protective layers.

4. The photovoltaic frame according to claim 2, wherein:
the third side edge portion, the first side edge portion, the top support portion and the bottom support portion are configured to form a closed cavity;
the closed cavity having an inner wall surface including the right surface of the third side edge portion, the third outer surface of the top support portion, the left surface of the first side edge portion and the upper surface of the bottom support portion;
the first weather-resistant protective layer is configured to at least cover the first outer surface, the second outer surface, the left surface of the third side edge portion, the lower surface of the bottom support portion and the right surface of the first side edge portion; and
the second weather-resistant protective layer is configured to cover at least part of the inner wall surface of the closed cavity.

5. The photovoltaic frame according to claim 4, wherein the second weather-resistant protective layer is configured to cover the right surface of the third side edge portion and the left surface of the first side edge portion.

6. The photovoltaic frame according to claim 2, wherein the first and second weather-resistant protective layers include an alloy plating layer or an organic film layer.

7. The photovoltaic frame according to claim 2, wherein a grammage of the first weather-resistant protective layer is in a range of 20 g/m² to 500 g/m²; a grammage of the second weather-resistant protective layer is in a range of 0 g/m² to 500 g/m².

8. The photovoltaic frame according to claim 1, wherein the inner wall of the holding slot includes the first inner surface, the second inner surface and the third inner surface, and the inner wall is not covered with the first and second weather-resistant protective layers.

9. The photovoltaic frame according to claim 1, wherein the first weather-resistant protective layer is configured to cover the first inner surface, the second inner surface and the third inner surface; and
the second weather-resistant protective layer is configured to cover the first outer surface, the second outer surface and the third outer surface.

10. The photovoltaic frame according to claim 1, wherein the first and second weather-resistant protective layers include an alloy plating layer or an organic film layer.

11. The photovoltaic frame according to claim 1, wherein a grammage of the first weather-resistant protective layer is in a range of 20 g/m² to 500 g/m²; a grammage of the second weather-resistant protective layer is in a range of 0 g/m² to 500 g/m².

12. A photovoltaic module, comprising a stacked structure and a photovoltaic frame;
the photovoltaic frame including:
a top support portion,
a bottom support portion, arranged opposite to the top support portion;
a first side edge portion, configured to connect the top support portion and the bottom support portion;
a transverse edge portion, located at one side of the top support portion away from the bottom support portion;
a second side edge portion, configured to connect the top support portion and the transverse edge portion;
wherein:
the top support portion, the second side edge portion and the transverse edge portion form a holding slot configured to hold a stacked structure; the top support portion has a bearing surface facing the holding slot;
the second side edge portion has a first inner surface and a first outer surface which are opposite to each other, and the first inner surface being a part of an inner wall of the holding slot;
the transverse edge portion has a second inner surface and a second outer surface which are opposite to each other, and the second inner surface facing the top support portion;
the top support portion has a third inner surface and a third outer surface which are opposite to each other, and the third inner surface facing the transverse edge portion;
the bottom support portion has an upper surface and a lower surface which are opposite to each other; and
the first side edge portion has a left surface and a right surface which are opposite to each other;
a first weather-resistant protective layer, configured to cover at least one of the first inner surface, the first outer surface the second inner surface, the second outer surface, the third inner surface, the third outer surface, the upper surface, the lower surface, the left and right surfaces of the first side edge portion; and a second weather-resistant protective layer, configured to cover at least one of surfaces that are not covered by the first weather-resistant protective layer in the first inner surface, the first outer surface the second inner surface, the second outer surface, the third inner surface, the third outer surface, the upper surface, the lower surface, the left and right surfaces of the first side edge portion;

wherein a thickness of the second weather-resistant protective layer is less than a thickness of the first weather-resistant protective layer;

wherein the stacked structure comprises a panel, a first adhesive film, a cell piece, a second adhesive film and a backplane that are sequentially stacked.

13. The photovoltaic module according to claim 12, wherein the photovoltaic module further includes a filling portion for filling a gap area between the stacked structure and the holding slot.

14. The photovoltaic module according to claim 12, wherein the photovoltaic frame further includes a third side edge portion, configured to connect the top support portion and the bottom support portion;

the third side edge portion having a left surface and a right surface which are opposite to each other, the right surface of the third side edge portion facing the first side edge portion; and wherein the first weather-resistant protective layer is further configured to cover one of the left and right surfaces of the third side edge portion, and the second weather-resistant protective layer is further configured to cover a surface that is not covered by the first weather-resistant protective layer in the left and right surfaces of the third side edge portion.

15. The photovoltaic module according to claim 14, wherein the inner wall of the holding slot includes the first inner surface, the second inner surface and the third inner surface, and the inner wall is not covered with the first and second weather-resistant protective layers.

16. The photovoltaic module according to claim 14, wherein:

the third side edge portion, the first side edge portion, the top support portion and the bottom support portion are configured to form a closed cavity;

the closed cavity having an inner wall surface including the right surface of the third side edge portion, the third outer surface of the top support portion, the left surface of the first side edge portion and the upper surface of the bottom support portion;

the first weather-resistant protective layer is configured to at least cover the first outer surface, the second outer surface, the left surface of the third side edge portion, the lower surface of the bottom support portion and the right surface of the first side edge portion; and the second weather-resistant protective layer is configured to cover at least part of the inner wall surface of the closed cavity.

17. The photovoltaic module according to claim 16, wherein the second weather-resistant protective layer is configured to cover the right surface of the third side edge portion and the left surface of the first side edge portion.

18. The photovoltaic module according to claim 12, wherein a grammage of the first weather-resistant protective layer is in a range of 20 $g/m^2$ to 500 $g/m^2$; a grammage of the second weather-resistant protective layer is in a range of 0 $g/m^2$ to 500 $g/m^2$.

19. The photovoltaic module according to claim 12, wherein the inner wall of the holding slot includes the first inner surface, the second inner surface and the third inner surface, and the inner wall is not covered with the first and second weather-resistant protective layers.

20. The photovoltaic module according to claim 12, wherein:

the first weather-resistant protective layer is configured to cover the first inner surface, the second inner surface and the third inner surface; and the second weather-resistant protective layer is configured to cover the first outer surface, the second outer surface and the third outer surface.

* * * * *